(12) United States Patent
Muramatsu et al.

(10) Patent No.: US 11,252,338 B2
(45) Date of Patent: Feb. 15, 2022

(54) INFRARED CAMERA SYSTEM AND VEHICLE

(71) Applicant: KOITO MANUFACTURING CO., LTD., Tokyo (JP)

(72) Inventors: Takao Muramatsu, Shizuoka (JP); Shigeyuki Watanabe, Shizuoka (JP); Masaaki Sato, Shizuoka (JP); Akinobu Kubota, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/713,810

(22) Filed: Dec. 13, 2019

(65) Prior Publication Data
US 2020/0195831 A1  Jun. 18, 2020

(30) Foreign Application Priority Data

Dec. 14, 2018 (JP) .............................. JP2018-234434

(51) Int. Cl.
| | |
|---|---|
| H04N 5/235 | (2006.01) |
| H04N 5/247 | (2006.01) |
| B62D 15/02 | (2006.01) |
| B60R 11/04 | (2006.01) |
| H04N 5/225 | (2006.01) |

(52) U.S. Cl.
CPC .......... *H04N 5/2354* (2013.01); *B60R 11/04* (2013.01); *B62D 15/021* (2013.01); *H04N 5/2253* (2013.01); *H04N 5/247* (2013.01)

(58) Field of Classification Search
CPC .... H04N 5/2354; H04N 5/247; H04N 5/2253; B62D 15/021; B60R 11/04
See application file for complete search history.

(56) References Cited

U.S. PATENT DOCUMENTS

| | | | | | |
|---|---|---|---|---|---|
| 5,428,512 | A | * | 6/1995 | Mouzas ................... | B60Q 1/12 362/249.13 |
| 5,769,524 | A | * | 6/1998 | Yuan ....................... | B60Q 1/12 315/82 |

(Continued)

FOREIGN PATENT DOCUMENTS

| | | | | | |
|---|---|---|---|---|---|
| JP | 62273477 | A | * | 11/1987 | ............. B60Q 9/005 |
| JP | H09-277887 | A | | 10/1997 | |

(Continued)

*Primary Examiner* — William C Vaughn, Jr.
*Assistant Examiner* — Naod W Belai
(74) *Attorney, Agent, or Firm* — Osha Bergman Watanabe & Burton LLP

(57) ABSTRACT

A left infrared camera module includes a left infrared irradiation unit configured to emit infrared toward a left side region of a vehicle, a left infrared camera configured to acquire infrared image data indicative of a surrounding environment in the left side region of the vehicle, and a control unit configured to control an operation of the left infrared irradiation unit. The control unit is configured to change an intensity of the infrared to be emitted from the left infrared irradiation unit, in correspondence to a condition relating to a traveling state of the vehicle. The left infrared camera module configured as described above can detect the surrounding environment in the side region of the vehicle without causing an uncomfortable feeling to other vehicle, a pedestrian and the like.

11 Claims, 10 Drawing Sheets

(56) References Cited

U.S. PATENT DOCUMENTS

| | | | | |
|---|---|---|---|---|
| 5,854,537 A | * | 12/1998 | Gotoh | B60Q 1/085 315/82 |
| 6,343,869 B1 | * | 2/2002 | Kobayashi | B60Q 1/085 362/37 |
| 6,481,876 B2 | * | 11/2002 | Hayami | B60Q 1/085 362/464 |
| 7,210,828 B2 | * | 5/2007 | Fukawa | B60Q 1/12 307/10.8 |
| 9,718,405 B1 | * | 8/2017 | Englander | B60R 1/00 |
| 2002/0015308 A1 | * | 2/2002 | Naganawa | B60Q 1/12 362/464 |
| 2002/0039295 A1 | * | 4/2002 | Kobayashi | B60Q 1/18 362/465 |
| 2003/0025078 A1 | * | 2/2003 | Yamaguchi | H05B 47/11 250/330 |
| 2003/0045984 A1 | * | 3/2003 | Horii | B60Q 1/085 701/49 |
| 2003/0122704 A1 | * | 7/2003 | Dubrovin | G01S 17/86 342/70 |
| 2005/0180139 A1 | * | 8/2005 | Takeda | F21S 41/147 362/276 |
| 2005/0243566 A1 | * | 11/2005 | Hasumi | B60Q 1/12 362/465 |
| 2005/0275562 A1 | * | 12/2005 | Watanabe | B60Q 1/18 340/933 |
| 2006/0017807 A1 | * | 1/2006 | Lee | H04N 5/232 348/36 |
| 2006/0115115 A1 | * | 6/2006 | Nagaoka | G06K 9/00805 382/103 |
| 2006/0250225 A1 | * | 11/2006 | Widmann | B60R 11/0229 340/438 |
| 2006/0287826 A1 | * | 12/2006 | Shimizu | B60Q 1/0023 701/431 |
| 2007/0109801 A1 | * | 5/2007 | Panopoulos | B60Q 1/16 362/465 |
| 2009/0034281 A1 | * | 2/2009 | Hamkens | C03C 3/097 362/520 |
| 2010/0290774 A1 | * | 11/2010 | Matsuoka | B60Q 1/24 396/155 |
| 2011/0234802 A1 | * | 9/2011 | Yamada | G03B 15/02 348/148 |
| 2012/0002050 A1 | * | 1/2012 | Taniguchi | G08G 1/167 348/148 |
| 2012/0041617 A1 | * | 2/2012 | Aimura | G06K 9/00805 701/1 |
| 2012/0306368 A1 | * | 12/2012 | Tatara | B60Q 1/18 315/81 |
| 2013/0076240 A1 | * | 3/2013 | Endo | B60Q 1/085 315/82 |
| 2013/0208118 A1 | * | 8/2013 | Wu | H04N 7/183 348/148 |
| 2013/0242100 A1 | * | 9/2013 | Seki | F21S 41/153 348/148 |
| 2013/0343071 A1 | * | 12/2013 | Nagaoka | B60Q 9/008 362/466 |
| 2014/0172239 A1 | * | 6/2014 | Vergara | B60Q 1/24 701/49 |
| 2015/0203026 A1 | * | 7/2015 | Schotanus | B60Q 1/326 362/520 |
| 2015/0203033 A1 | * | 7/2015 | Watanabe | B60R 1/00 348/148 |
| 2016/0238210 A1 | * | 8/2016 | Masuda | F21S 45/10 |
| 2016/0332560 A1 | * | 11/2016 | Nakatani | B60Q 1/143 |
| 2017/0106783 A1 | * | 4/2017 | Fritz | B60Q 1/0011 |
| 2017/0267167 A1 | * | 9/2017 | Sakata | B60Q 1/38 |
| 2017/0368987 A1 | * | 12/2017 | Mega | B60Q 1/38 |
| 2018/0272935 A1 | * | 9/2018 | Moriwaki | H05B 45/20 |
| 2019/0041038 A1 | * | 2/2019 | White | B60Q 1/143 |
| 2019/0061604 A1 | * | 2/2019 | Wang | B60Q 1/12 |
| 2019/0162381 A1 | * | 5/2019 | Estes | F21V 7/0091 |
| 2019/0394626 A1 | * | 12/2019 | Hitotsumatsu | H04W 4/38 |
| 2020/0001777 A1 | * | 1/2020 | Hiroi | B60Q 1/14 |
| 2020/0158308 A1 | * | 5/2020 | Kitazawa | F21S 41/675 |

FOREIGN PATENT DOCUMENTS

| | | | |
|---|---|---|---|
| JP | 2004082918 A | * | 3/2004 |
| JP | 2005059662 A | * | 3/2005 |

* cited by examiner

INFRARED CAMERA SYSTEM AND VEHICLE

CROSS-REFERENCE TO RELATED APPLICATIONS

This application is based upon and claims the benefit of priority from prior Japanese patent application No. 2018-234434, filed on Dec. 14, 2018, the entire contents of which are incorporated herein by reference.

TECHNICAL FIELD

The present disclosure relates to an infrared camera system and a vehicle provided with the infrared camera system.

BACKGROUND ART

Currently, research on automatic driving technology of an automobile has been actively conducted in each country, and each country is considering the legislation so as to enable a vehicle (hereinafter, a "vehicle" refers to an automobile) to travel in an automatic driving mode on public roads. Here, in the automatic driving mode, a vehicle system automatically controls traveling of a vehicle. Specifically, in the automatic driving mode, the vehicle system automatically performs at least one of a steering control (control of a traveling direction of the vehicle), a brake control and an accelerator control (control of braking and acceleration/deceleration of the vehicle) based on information (surrounding environment information) indicative of a surrounding environment of the vehicle and obtained from sensors such as a camera, a radar (for example, a laser radar or a millimeter wave radar) and the like. On the other hand, in a manual driving mode to be described later, a driver controls the traveling of the vehicle, as in most of conventional vehicles. Specifically, in the manual driving mode, the traveling of the vehicle is controlled in conformity with a driver's operation (a steering operation, a braking operation, and an accelerator operation), and the vehicle system does not automatically perform the steering control, the brake control and the accelerator control. Meanwhile, the driving mode of the vehicle is not a concept existing only in some vehicles but a concept existing in all vehicles including conventional vehicles having no automatic driving function. For example, the driving mode of the vehicle is classified in accordance with a vehicle control method or the like.

Thus, in the future, it is expected that vehicles traveling in the automatic driving mode (hereinafter, appropriately referred to as "automatic driving vehicle") and vehicles traveling in the manual driving mode (hereinafter, appropriately referred to as "manual driving vehicle") coexist on public roads.

As an example of the automatic driving technology, JP-A-H09-277887 discloses an automatic follow-up traveling system in which a following vehicle can automatically follow a preceding vehicle. In the automatic follow-up traveling system, each of the preceding vehicle and the following vehicle has an illumination system, character information for preventing the other vehicle from intruding between the preceding vehicle and the following vehicle is displayed on the illumination system of the preceding vehicle, and character information indicative of the automatic follow-up traveling mode is displayed on the illumination system of the following vehicle.

For development of the automatic driving technology, it is necessary to considerably increase a recognition range of the vehicle with respect to the surrounding environment. In this respect, it is currently considered to mount a plurality of different sensors (for example, a camera, a LiDAR unit, a millimeter wave radar and the like) on the vehicle. For example, it is currently considered to mount a LiDAR unit and a visible light camera on a front surface and a rear surface of the vehicle, respectively. Also, in order to improve a recognition range of the vehicle with respect to the surrounding environment in a side region of the vehicle, it is also considered to mount the LiDAR unit and the visible light camera on a left side surface and a right side surface of the vehicle.

However, the number of the sensors to be mounted on the vehicle increases, so that the recognition range of the vehicle with respect to the surrounding environment is improved but the vehicle cost considerably increases. In particular, since a unit price of the LiDAR unit is high, the Vehicle cost dramatically increases as the number of the LiDAR units to be mounted on the vehicle increases.

In order to solve the problem, it is considered to mount only the visible light cameras on the left side surface and right side surface of the vehicle. In the meantime, when the vehicle is traveling at night, it is necessary to emit the visible light toward a side region of the vehicle so as to acquire image data, which indicates the surrounding environment in the side region of the vehicle, by the visible light camera. However, when the visible light is emitted toward the side region of the vehicle, there are concerns that an uncomfortable feeling may be caused to other vehicle, a pedestrian and the like. Therefore, when the vehicle is traveling at night, it is actually difficult to emit the visible light toward the side region of the vehicle, so that it is difficult to detect the surrounding environment of the side region of the vehicle by using the visible light cameras mounted on the left side surface and right side surface of the vehicle. From the above standpoints, there is a room for further improvement on the sensing system of the vehicle.

SUMMARY OF THE INVENTION

The present disclosure has been made in view of the above situations, and an object thereof is to provide an infrared camera system and a vehicle capable of detecting a surrounding environment in a side region of the vehicle without causing an uncomfortable feeling to other vehicle, a pedestrian and the like.

An infrared camera system of an aspect of the present disclosure is provided to a vehicle and includes an infrared irradiation unit configured to emit infrared toward a side region of the vehicle, an infrared camera configured to acquire infrared image data indicative of a surrounding environment in the side region of the vehicle, and a control unit configured to control an operation of the infrared irradiation unit.

The control unit is configured to change an intensity of the infrared to be emitted from the infrared irradiation unit, in correspondence to a condition relating to a traveling state of the vehicle.

According to the above configuration, even when the vehicle is traveling in a dark environment, it is possible to detect the surrounding environment in the side region of the vehicle by using the infrared camera mounted to the vehicle. Also, since the infrared other than the visible light is emitted toward the side region of the vehicle, as light for the infrared camera, it is possible to prevent a situation in which the uncomfortable feeling is caused to the other vehicle, a pedestrian and the like. In this way, it is possible to provide the infrared camera system capable of detecting the surrounding environment in the side region of the vehicle without causing an uncomfortable feeling to the other vehicle, a pedestrian and the like.

Also, the intensity of the infrared to be emitted from the infrared irradiation unit is changed in correspondence to the condition relating to the traveling state of the vehicle. In this way, it is possible to securely detect the surrounding environment in a detection range of the infrared camera when the traveling state of the vehicle changes.

Also, the infrared irradiation unit may include a left infrared irradiation unit configured to emit the infrared toward a left side region of the vehicle and a right infrared irradiation unit configured to emit the infrared toward a right side region of the vehicle.

The infrared camera may include a left infrared camera configured to acquire infrared image data indicative of a surrounding environment in the left side region of the vehicle and a right infrared camera configured to acquire infrared image data indicative of a surrounding environment in the right side region of the vehicle.

The control unit may be configured to change the intensity of the infrared to be emitted from the left infrared irradiation unit and/or the right infrared irradiation unit, in correspondence to the condition relating to the traveling state of the vehicle.

According to the above configuration, since the intensity of the infrared to be emitted from the left infrared irradiation unit is changed in correspondence to the condition relating to the traveling state of the vehicle, it is possible to securely detect the surrounding environment in a detection range of the left infrared camera. Also, since the intensity of the infrared to be emitted from the right infrared irradiation unit is changed in correspondence to the condition relating to the traveling state of the vehicle, it is possible to securely detect the surrounding environment in a detection range of the right infrared camera.

Also, the control unit may be configured to increase the intensity of the infrared to be emitted from the infrared irradiation unit, in correspondence to a curve traveling of the vehicle.

According to the above configuration, since the intensity of the infrared to be emitted from the infrared irradiation unit is increased, in correspondence to the curve traveling of the vehicle, it is possible to securely detect the surrounding environment in the detection range of the infrared camera during the curve traveling of the vehicle.

Also, the control unit may be configured to increase the intensity of the infrared to be emitted from the left infrared irradiation unit, in correspondence to a leftward curve traveling of the vehicle. Also, the control unit may be configured to increase the intensity of the infrared to be emitted from the right infrared irradiation unit, in correspondence to a rightward curve traveling of the vehicle.

According to the above configuration, the intensity of the infrared to be emitted from the left infrared irradiation unit is increased, in correspondence to the leftward curve traveling (left turn or left curve traveling) of the vehicle. In this way, it is possible to securely detect the surrounding environment in the detection range of the left infrared camera during the leftward curve traveling of the vehicle. Also, the intensity of the infrared to be emitted from the right infrared irradiation unit is increased, in correspondence to the rightward curve traveling (right turn or right curve traveling) of the vehicle. In this way, it is possible to securely detect the surrounding environment in the detection range of the right infrared camera during the rightward curve traveling of the vehicle.

Also, the control unit may be configured to increase the intensity of the infrared to be emitted from the left infrared irradiation unit to be greater than the intensity of the infrared to be emitted from the right infrared irradiation unit, in correspondence to the leftward curve traveling of the vehicle. Also, the control unit may be configured to increase the intensity of the infrared to be emitted from the right infrared irradiation unit to be greater than the intensity of the infrared to be emitted from the left infrared irradiation unit, in correspondence to the rightward curve traveling of the vehicle.

Also, the control unit may increase the intensity of the infrared to be emitted from the left infrared irradiation unit when the vehicle is moved to a left traffic lane. Also, the control unit may increase the intensity of the infrared to be emitted from the right infrared irradiation unit when the vehicle is moved to a right traffic lane.

According to the above configuration, when the vehicle is moved to the left traffic lane, the intensity of the infrared to be emitted from the left infrared irradiation unit is increased. In this way, it is possible to securely detect the surrounding environment in the detection range of the left infrared camera upon the movement of the vehicle to the left traffic lane. Also, when the vehicle is moved to the right traffic lane, the intensity of the infrared to be emitted from the right infrared irradiation unit is increased. In this way, it is possible to securely detect the surrounding environment in the detection range of the right infrared camera upon the movement of the vehicle to the right traffic lane.

Also, the control unit may be configured to increase the intensity of the infrared to be emitted from the infrared irradiation unit, in correspondence to a steering angle of a steering wheel.

According to the above configuration, since the intensity of the infrared to be emitted from the infrared irradiation unit is increased, in correspondence to the steering angle of the steering wheel, it is possible to securely detect the surrounding environment in the detection range of the infrared camera during the curve traveling of the vehicle.

The control unit may increase the intensity of the infrared to be emitted from the right infrared irradiation unit when the steering angle of the steering wheel in a counterclockwise direction exceeds a first steering angle. Also, the control unit may increase the intensity of the infrared to be emitted from the left infrared irradiation unit when the steering angle of the steering wheel in a clockwise direction exceeds a second steering angle.

According to the above configuration, when the steering angle of the steering wheel in the counterclockwise direction exceeds the first steering angle, the intensity of the infrared to be emitted from the right infrared irradiation unit is increased. In this way, during the leftward curve traveling of the vehicle, it is possible to securely detect the surrounding environment in the detection range of the right infrared camera. Also, when the steering angle of the steering wheel in the clockwise direction exceeds the second steering angle, the intensity of the infrared to be emitted from the left infrared irradiation unit is increased. In this way, during the rightward curve traveling of the vehicle, it is possible to securely detect the surrounding environment in the detection range of the left infrared camera. In this way, it is possible to securely detect the surrounding environment in an opposite direction to a direction in which a driver of the vehicle faces.

Also, the control unit may be configured to increase the intensity of the infrared to be emitted from the infrared irradiation unit, in correspondence to lighting of a turn signal lamp.

According to the above configuration, since the intensity of the infrared to be emitted from the infrared irradiation unit is increased, in correspondence to the lighting of the turn signal lamp, it is possible to securely detect the surrounding environment in the detection range of the infrared camera when a traveling pathway of the vehicle is changed.

Also, the control unit may be configured to increase the intensity of the infrared to be emitted from the left infrared irradiation unit, in correspondence to lighting of a left turn signal lamp. Also, the control unit may be configured to increase the intensity of the infrared to be emitted from the right infrared irradiation unit, in correspondence to lighting of a right turn signal lamp.

According to the above configuration, the intensity of the infrared to be emitted from the left infrared irradiation unit is increased, in correspondence to the lighting of the left turn signal lamp. In this way, when the vehicle changes leftward the pathway, it is possible to securely detect the surrounding environment in the detection range of the left infrared camera. Also, the intensity of the infrared to be emitted from the right infrared irradiation unit is increased, in correspondence to the lighting of the right turn signal lamp. In this way, when the vehicle changes rightward the pathway, it is possible to securely detect the surrounding environment in the detection range of the right infrared camera.

Also, the control unit may increase the intensity of the infrared to be emitted from the infrared irradiation unit when a traveling speed of the vehicle is equal to or less than a predetermined speed.

According to the above configuration, the intensity of the infrared to be emitted from the infrared irradiation unit is increased when the traveling speed of the vehicle is equal to or less than the predetermined speed. In this way, when the vehicle is traveling at low speed or stops, it is possible to securely detect the surrounding environment in the detection range of the infrared camera.

A vehicle provided with the infrared camera system may also be provided.

According to the above configuration, it is possible to provide the vehicle capable of detecting the surrounding environment in the side region of the vehicle without causing an uncomfortable feeling to the other vehicle, a pedestrian and the like.

According to the present disclosure, it is possible to provide the infrared camera system and vehicle capable of detecting the surrounding environment in the side region of the vehicle without causing an uncomfortable feeling to the other vehicle, a pedestrian and the like.

DETAILED DESCRIPTION

Figure 1:
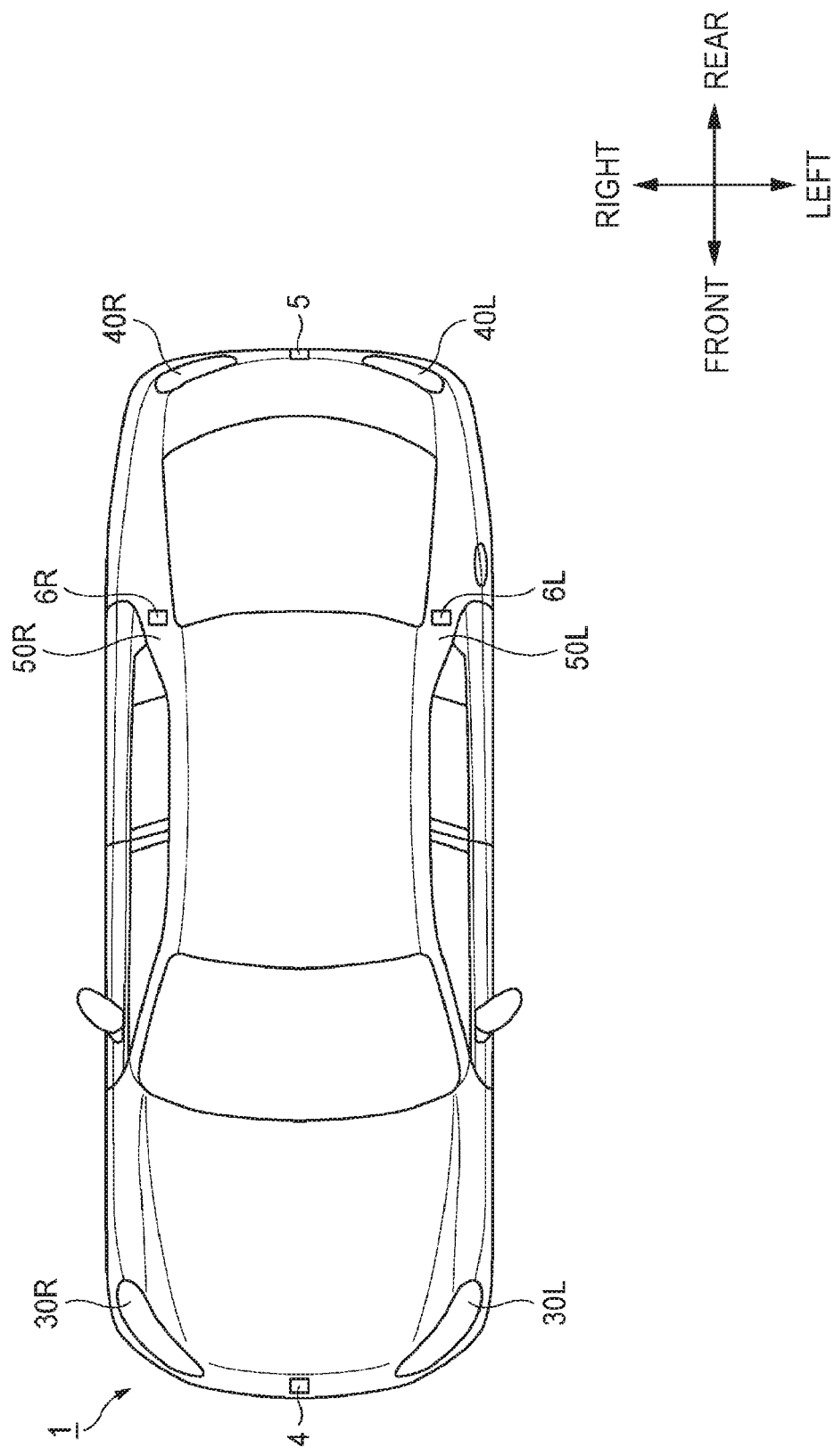
FIG. 1 is a plan view of a vehicle in which a vehicle system in accordance with an embodiment of the present disclosure (hereinbelow, simply referred to as 'present embodiment') is mounted.

Hereinbelow, an embodiment of the present disclosure (hereinbelow, referred to as 'present embodiment') will be described with reference to the drawings. The dimensions of the respective members shown in the drawings may different from the dimensions of the actual members, for the sake of convenience of description.

Also, in the description of the present embodiment, for the sake of convenience of description, "the right and left direction", "the upper and lower direction" and "the front and rear direction" will be appropriately mentioned. The directions are relative directions set with respect to a vehicle 1 shown in FIG. 1. Here, "the right and left direction" is a direction including "the rightward direction" and "the leftward direction". "The upper and lower direction" is a direction including "the upward direction" and "the downward direction". "The front and rear direction" is a direction including "the forward direction" and "the rearward direction". Although the upper and lower direction is not shown in FIG. 1, it is a direction perpendicular to the right and left direction and the front and rear direction.

Figure 2:
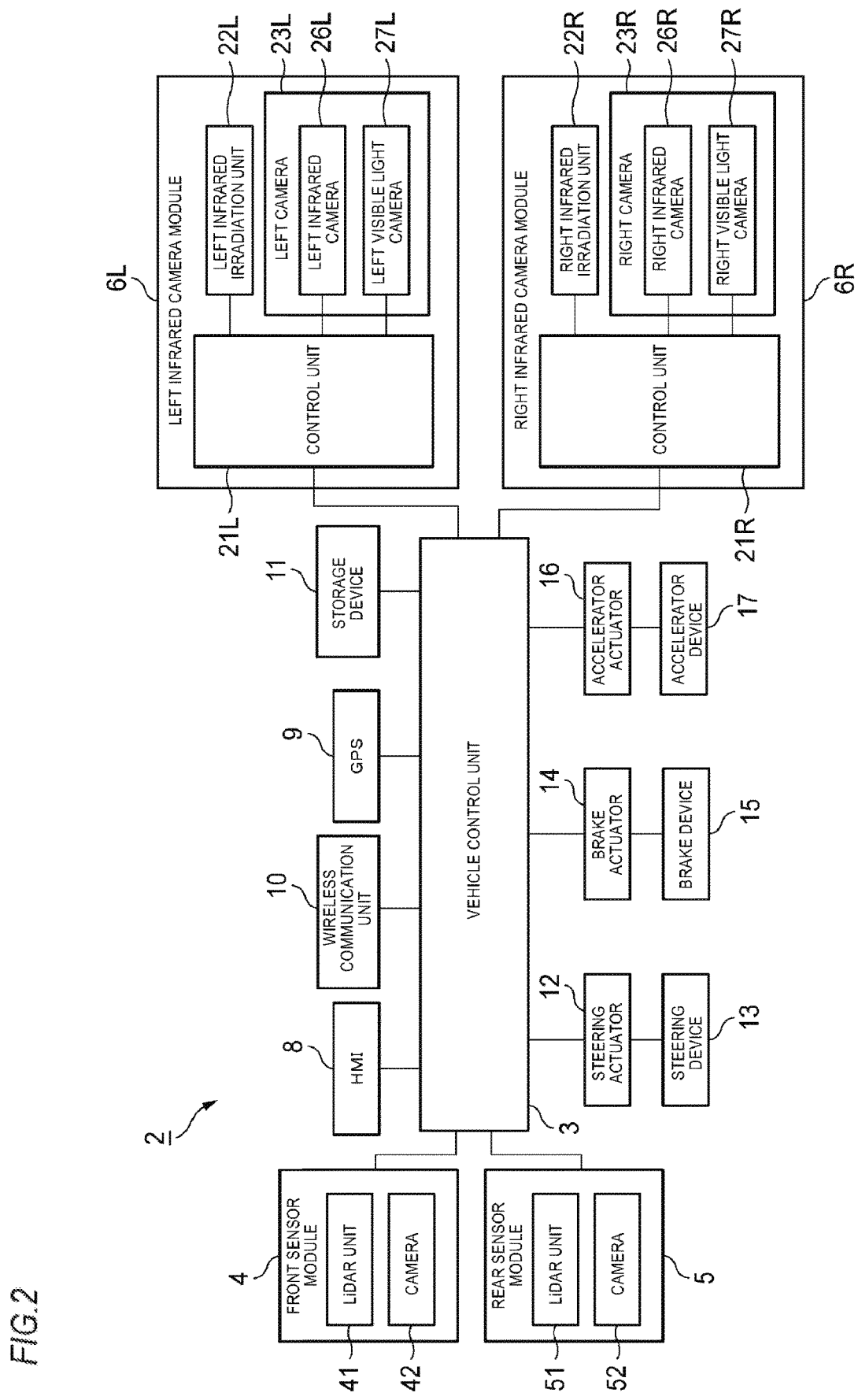
FIG. 2 is a block diagram of the vehicle system in accordance with the present embodiment.

First, a vehicle system 2 of the present embodiment is described with reference to FIGS. 1 and 2. FIG. 1 is a plan view of a vehicle 1 provided with a vehicle system 2. FIG. 2 is a block diagram of the vehicle system 2. The vehicle 1 is a vehicle (automobile) capable of traveling in an automatic driving mode.

As shown in FIG. 2, the vehicle system 2 includes a vehicle control unit 3, a front sensor module 4, a rear sensor module 5, a left infrared camera module 6L, and a right infrared camera module 6R. Also, the vehicle system 2 includes an HMI (Human Machine Interface) 8, a GPS (Global Positioning System) 9, a wireless communication unit 10, and a storage device 11. The vehicle system 2 further includes a steering actuator 12, a steering device 13, a brake actuator 14, a brake device 15, an accelerator actuator 16, and an accelerator device 17.

The vehicle control unit 3 is configured to control traveling of the vehicle 1. The vehicle control unit 3 is configured by, for example, at least one an electronic control unit (ECU). The electronic control unit includes a computer system (for example, SoC (System on a Chip) and the like) having one or more processors and one or more memories, and an electronic circuit having an active element such as a transistor and a passive element. The processor includes, for example, at least one of a CPU (Central Processing Unit), an MPU (Micro Processing Unit), a GPU (Graphics Processing Unit) and a TPU (Tensor Processing Unit). The CPU may be configured by a plurality of CPU cores. The GPU may be configured by a plurality of GPU cores. The memory includes a ROM (Read Only Memory) and a RAM (Random Access Memory). In the ROM, a vehicle control program may be stored. For example, the vehicle control program may include an artificial intelligence (AI) program for automatic driving. The AI program is a program established by a supervised or unsupervised machine learning (particularly, deep learning) using a multi-layered neural network. In the RAM, the vehicle control program, vehicle control data and/or surrounding environment information indicative of a surrounding environment of the vehicle may be temporarily stored. The processor may be configured to develop, on the RAM, a program designated from the diverse vehicle control programs stored in the ROM and to execute a variety of processing in cooperation with the RAM. Also, the computer system may be configured by a non-Neumann type computer such as an ASIC (Application Specific Integrated Circuit), an FPGA (Field-Programmable Gate Array) and the like. Also, the computer system may be configured by a combination of a Neumann type computer and a non-Neumann type computer.

The front sensor module 4 includes a LiDAR unit 41, and a camera 42. The LiDAR unit 41 is configured to acquire 3D mapping data (dot group data) indicative of a surrounding environment in a front region of the vehicle 1 and to transmit the acquired 3D mapping data to the vehicle control unit 3. The vehicle control unit 3 is configured to specify information indicative of the surrounding environment in the front region of the vehicle 1 (hereinbelow, referred to as "surrounding environment information"), based on the transmitted 3D mapping data. The surrounding environment information may include information about a target object outside the vehicle 1. For example, the surrounding environment information may include information about attributes of a target object outside the vehicle 1 and information about a distance and a position of the target object relative to the vehicle 1. The camera 42 is configured to acquire image data indicative of the surrounding environment in the front region of the vehicle 1, and to transmit the acquired image data to the vehicle control unit 3. The vehicle control unit 3 is configured to specify the surrounding environment information in the front region, based on the transmitted image data.

A detection region of the LiDAR unit 41 and a detection region of the camera 42 may at least partially overlap each other. The front sensor module 4 is disposed in a predetermined position of a front surface of the vehicle 1. For example, the front sensor module 4 may be disposed on a front grill or front bumper or in a left headlamp 30L and/or a right headlamp 30R. In a case in which the vehicle 1 has the two front sensor modules 4, one front sensor module 4 may be disposed in the left headlamp 30L and the other front sensor module 4 may be disposed in the right headlamp 30R.

The rear sensor module 5 includes a LiDAR unit 51 and a camera 52. The LiDAR 51 is configured to acquire 3D mapping data (dot group data) indicative of a surrounding environment in a rear region of the vehicle 1 and to transmit the acquired 3D mapping data to the vehicle control unit 3. The vehicle control unit 3 is configured to specify the surrounding environment information in the rear region, based on the transmitted 3D mapping data. The camera 52 is configured to acquire image data indicative of the surrounding environment in the rear region of the vehicle 1, and to transmit the acquired image data to the vehicle control unit 3. The vehicle control unit 3 is configured to specify the surrounding environment information in the rear region, based on the transmitted image data.

A detection region of the LiDAR unit 51 and a detection region of the camera 52 may at least partially overlap each other. The rear sensor module 5 is disposed in a predetermined position of a rear surface of the vehicle 1. For example, the rear sensor module 5 may be disposed on a rear grill or rear bumper or in a left rear lamp 40L and/or a right rear lamp 40R. In a case in which the vehicle 1 has the two rear sensor modules 5, one rear sensor module 5 may be disposed in the left rear lamp 40L and the other rear sensor module 5 may be disposed in the right rear lamp 40R.

A left infrared camera module 6L (an example of a left infrared camera system) is mounted on a left C pillar 50L (an example of a left rear pillar) of the vehicle 1, and includes a left infrared irradiation unit 22L, a left camera 23L, and a control unit 21L. The left camera 23L includes a left infrared camera 26L, and a left visible light camera 27L.

The left infrared irradiation unit 22L is configured to emit infrared (particularly, near infrared) toward a left side region of the vehicle 1. A wavelength band of the infrared to be emitted from the left infrared irradiation unit 22L is, for example, within a range of 700 nm to 2500 nm. Also, a peak wavelength of the infrared is, for example, 850 nm, 940 nm or 1050 nm. The left infrared camera 26L is configured to acquire infrared image data indicative of the surrounding environment in the left side region of the vehicle 1. The left visible light camera 27L is configured to acquire visible light image data indicative of the surrounding environment in the left side region of the vehicle 1. For example, in a case in which each of RGB elements of one pixel of the visible light image data has an amount of data of 8 bits, the visible light image data has an amount of data of 24 bits per one pixel. The vehicle control unit 3 or the control unit 21L is configured to specify the surrounding environment in the left side region, based on the infrared image data and/or the visible light image data. Also, an optical axis $AL_2$ (refer to FIG. 4) of the left infrared irradiation unit 22L and an optical axis (not shown) of the left infrared camera 26L may be substantially in parallel to each other. In this case, it is possible to favorably prevent an insufficient amount of the infrared light in a detection region of the left infrared camera 26L.

Figure 4:
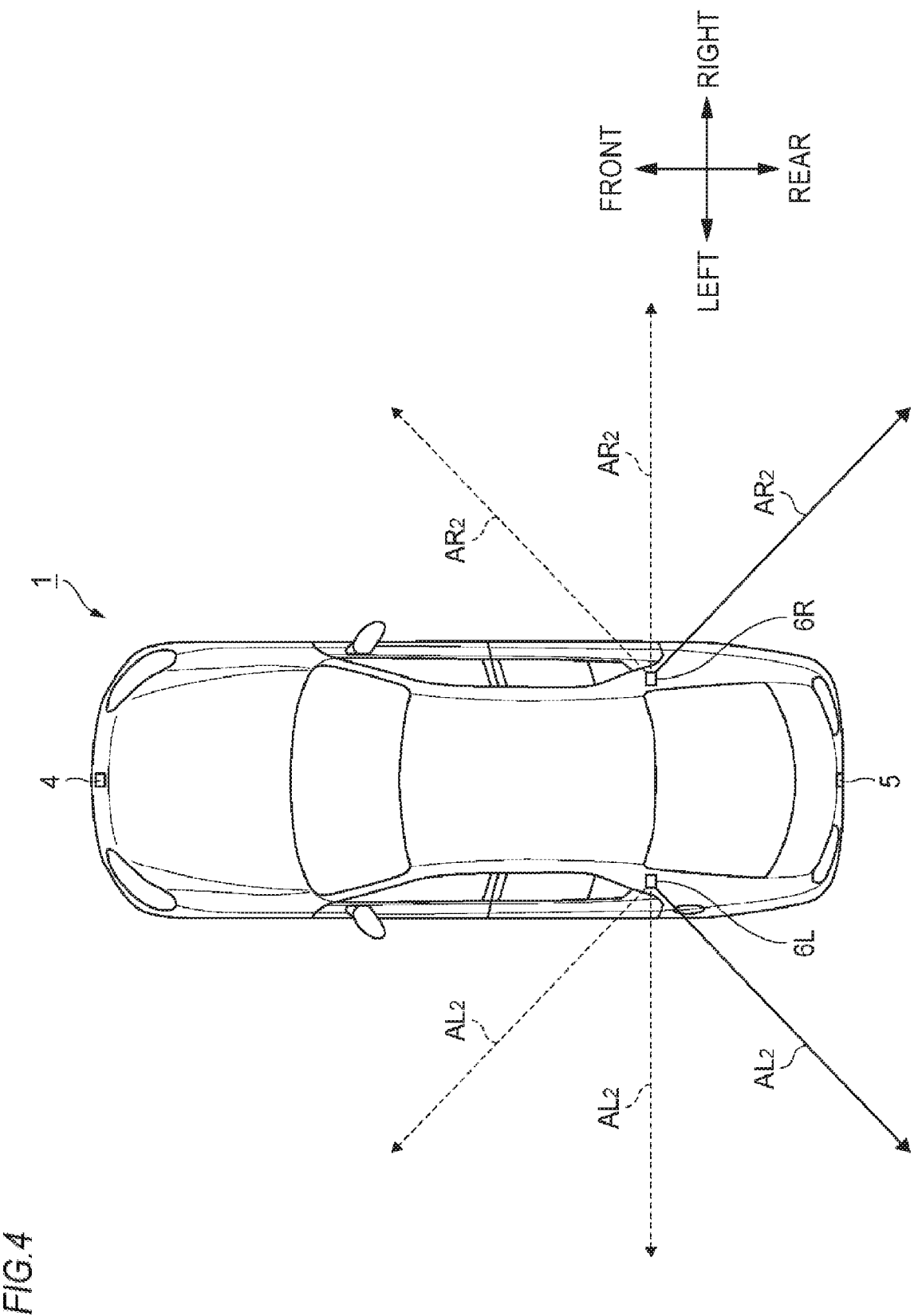
FIG. 4 depicts an optical axis of a left infrared camera and an optical axis of a right infrared camera.

Also, as shown in FIG. 4, the optical axis $AL_2$ of the left infrared irradiation unit 22L may be directed in a left rear direction of the vehicle (refer to the arrow shown with the solid line) or in the right and left direction (refer to the arrow shown with the broken line). Also, the optical axis $AL_2$ may be directed in a left front direction of the vehicle (refer to the arrow shown with the broken line).

Also, the left infrared camera 26L and the left visible light camera 27L may be integrally or individually configured. In a case in which the left infrared camera 26L and the left visible light camera 27L are integrally configured, a color filter array (CFA) in which RGB color filters and infrared filters are aligned in an array shape may be used for the left camera 23L. When the left infrared camera 26L and the left visible light camera 27L are integrally configured, it is possible to reduce the number of devices configuring the left infrared camera module 6L.

The control unit 21L is configured to control an operation of the left infrared irradiation unit 22L and operations of the left infrared camera 26L and the left visible light camera 27L. The control unit 21L includes a computer system (for example, SoC and the like) having one or more processors and one or more memories, and an electronic circuit having an active element such as a transistor and a passive element. The processor includes at least one of a CPU, an MPU, a GPU and a TPU. The memory includes a ROM and a RAM. Also, the computer system may be configured by a non-Neumann type computer such as an ASIC, an FPGA and the like.

For example, when it is determined on the basis of illuminance data acquired from an illuminance sensor (not shown) mounted to the vehicle 1 that the vehicle 1 is traveling in a light environment (specifically, a measured illuminance is greater than a threshold illuminance), the control unit 21L may cause only the left visible light camera 27L of the left camera 23L to operate. On the other hand, when it is determined on the basis of the illuminance data that the vehicle 1 is traveling in a dark environment (specifically, the measured illuminance is equal to or less than the threshold illuminance), the control unit 21L may cause only the left infrared camera 26L of the left camera 23L to operate. In this case, the control unit 21L may turn on the left infrared irradiation unit 22L. In this way, it is possible to specify the surrounding environment information in the left side region of the vehicle 1 without depending on the brightness of the traveling environment of the vehicle 1.

In the meantime, the left infrared camera module 6L may be disposed on a left rear pillar (for example, a left D pillar) other than the left C pillar 50L. Also, in the present embodiment, the left infrared camera system is configured as the left infrared camera module 6L. However, the present embodiment is not limited thereto. In this respect, the left infrared camera system may not be packaged as one module. In this case, when the left infrared irradiation unit 22L and the left infrared camera 26L are disposed on the left rear pillar (for example, the left C pillar 50L) of the vehicle 1, the configuration of the left infrared camera system is not particularly limited. Also, the control unit 21L may be configured integrally with the control unit 21R and/or the vehicle control unit 3.

The right infrared camera module 6R (an example of a right infrared camera system) is mounted to a right C pillar 50R (an example of a right rear pillar) of the vehicle 1, and includes a right infrared irradiation unit 22R, a right camera 23R, and a control unit 21R. The right camera 23R includes a right infrared camera 26R, and a right visible light camera 27R.

The right infrared irradiation unit 22R is configured to emit infrared (near infrared) toward a right side region of the vehicle 1. A wavelength band of the infrared to be emitted from the right infrared irradiation unit 22R is, for example, within a range of 700 nm to 2500 nm. Also, a peak wavelength of the infrared is, for example, 850 nm, 940 nm or 1050 nm. The right infrared camera 26R is configured to acquire infrared image data indicative of the surrounding environment in the right side region of the vehicle 1. The right visible light camera 27R is configured to acquire visible light image data indicative of the surrounding environment in the right side region of the vehicle 1. The vehicle control unit 3 or the control unit 21R is configured to specify the surrounding environment in the right side region, based on the infrared image data and/or the visible light image data. Also, an optical axis $AR_2$ (refer to FIG. 4) of the right infrared irradiation unit 22R and an optical axis (not shown) of the right infrared camera 26R may be substantially in parallel to each other. In this case, it is possible to favorably prevent an insufficient amount of the infrared light in a detection region of the right infrared camera 26R.

Also, as shown in FIG. 4, the optical axis $AR_2$ of the right infrared irradiation unit 22R may be directed in a left rear direction of the vehicle (refer to the arrow shown with the solid line) or in the right and left direction (refer to the arrow shown with the broken line). Also, the optical axis $AR_2$ may be directed in a left front direction of the vehicle (refer to the arrow shown with the broken line).

The right infrared camera 26R and the right visible light camera 27R may be integrally or individually configured. In a case in which the right infrared camera 26R and the right visible light camera 27R are integrally configured, a color filter array (CFA) in which RGB color filters and infrared filters are aligned in an array shape may be used for the right camera 23R. When the right infrared camera 26R and the right visible light camera 27R are integrally configured, it is possible to reduce the number of devices configuring the right infrared camera module 6R.

The control unit 21R is configured to control an operation of the right infrared irradiation unit 22R and operations of the right infrared camera 26R and the right visible light camera 27R. The control unit 21R includes a computer system (for example, SoC and the like) having one or more processors and one or more memories, and an electronic circuit having an active element such as a transistor and a passive element. The processor includes at least one of a CPU, an MPU, a GPU and a TPU. The memory includes a ROM and a RAM. Also, the computer system may be configured by a non-Neumann type computer such as an ASIC, an FPGA and the like.

For example, when it is determined on the basis of the illuminance data acquired from the illuminance sensor (not shown) mounted to the vehicle 1 that the vehicle 1 is traveling in a light environment (specifically, a measured illuminance is greater than a threshold illuminance), the control unit 21R may cause only the right visible light camera 27R of the right camera 23R to operate. On the other hand, when it is determined on the basis of the illuminance data that the vehicle 1 is traveling in a dark environment (specifically, the measured illuminance is equal to or less than the threshold illuminance), the control unit 21R may cause only the right infrared camera 26R of the right camera 23R to operate. In this way, it is possible to specify the surrounding environment information in the right side region of the vehicle 1 without depending on the brightness of the traveling environment of the vehicle 1.

In the meantime, the right infrared camera module 6R may be disposed on a right rear pillar (for example, a right D pillar) other than the right C pillar 50R. Also, in the present embodiment, the right infrared camera system is configured as the right infrared camera module 6R. However, the present embodiment is not limited thereto. In this respect, the right infrared camera system may not be packaged as one module. In this case, when the right infrared irradiation unit 22R and the right infrared camera 26R are disposed on the right rear pillar (for example, the right C pillar 50R) of the vehicle 1, the configuration of the right infrared camera system is not particularly limited. Also, the control unit 21R may be configured integrally with the control unit 21L and/or the vehicle control unit 3.

The HMI 8 includes an input unit configured to receive an input operation from a driver and an output unit configured to output the traveling information and the like toward the driver. The input unit includes a steering wheel, an accelerator pedal, a brake pedal, a driving mode changeover switch for switching the driving mode of the vehicle 1, and the like. The output unit includes a display (for example, a head up display (HUD) and the like) configured to display various types of traveling information. The GPS 9 is configured to acquire current position information of the vehicle 1 and to output the acquired current position information to the vehicle control unit 3.

The wireless communication unit 10 is configured to receive information (for example, traveling information, and the like) relating to other vehicles around the vehicle 1 from the other vehicles and to transmit information (for example, traveling information, and the like) relating to the vehicle 1 to the other vehicles (inter-vehicle communication). Also, the wireless communication unit 10 is configured to receive infrastructure information from the infrastructure equipment such as a traffic light, a marker lamp and the like and to transmit the traveling information of the vehicle 1 to the infrastructure equipment (road-to-vehicle communication). Also, the wireless communication unit 10 is configured to receive information relating to a pedestrian from a portable electronic device (a smart phone, a tablet, a wearable device, and the like) carried by the pedestrian and to transmit the host vehicle traveling information of the vehicle 1 to the portable electronic device (pedestrian-to-vehicle communication). The vehicle 1 may be configured to perform communication with the other vehicle, the infrastructure equipment or the portable electronic device by an ad hook mode directly or via a communication network such as the Internet.

The storage device 11 is an external storage device such as a hard disc drive (HDD), an SSD (Solid State Drive) and the like. In the storage device 11, the 2D or 3D map information and/or the vehicle control program may be stored. For example, the 3D map information may be configured by the 3D mapping data (dot group data). The storage device 11 is configured to output the map information and the vehicle control program to the vehicle control unit 3, in response to a request from the vehicle control unit 3. The map information and the vehicle control program may be updated via the wireless communication unit 10 and the communication network.

When the vehicle 1 travels in an automatic driving mode, the vehicle control unit 3 automatically generates at least one of a steering control signal, an accelerator control signal and a brake control signal, based on the traveling state information, the surrounding environment information, the current position information, the map information and the like. The steering actuator 12 is configured to receive the steering control signal from the vehicle control unit 3 and to control the steering device 13 on the basis of the received steering control signal. The brake actuator 14 is configured to receive the brake control signal from the vehicle control unit 3 and to control the brake device 15 on the basis of the received brake control signal. The accelerator actuator 16 is configured to receive the accelerator control signal from the vehicle control unit 3 and to control the accelerator device 17 on the basis of the received accelerator control signal. In this way, the vehicle control unit 3 automatically controls the traveling of the vehicle 1, based on the traveling state information, the surrounding environment information, the current position information, the map information and the like. That is, in the automatic driving mode, the traveling of the vehicle 1 is automatically controlled by the vehicle system 2.

On the other hand, when the vehicle 1 travels in a manual driving mode, the vehicle control unit 3 generates a steering control signal, an accelerator control signal and a brake control signal in conformity with a driver's manual operation on the accelerator pedal, the brake pedal and the steering wheel. In this way, in the manual driving mode, the steering control signal, the accelerator control signal and the brake control signal are generated by the driver's manual operation, so that the traveling of the vehicle 1 is controlled by the driver.

Subsequently, the driving mode of the vehicle 1 is described. The driving mode includes an automatic driving mode and a manual driving mode. The automatic driving mode includes a full-automatic driving mode, an advanced driving support mode, and a driving support mode. In the full-automatic driving mode, the vehicle system 2 is configured to automatically perform all of the traveling controls of the steering control, the brake control and the accelerator control, and the driver is not in a state where it is possible to drive the vehicle 1. In the advanced driving support mode, the vehicle system 2 is configured to automatically perform all of the traveling controls of the steering control, the brake control and the accelerator control, and the driver does not drive the vehicle 1 although the driver is in a state where it is possible to drive the vehicle 1. In the driving support mode, the vehicle system 2 is configured to automatically perform a part of the traveling controls of the steering control, the brake control and the accelerator control, and the driver drives the vehicle 1 under the driving support of the vehicle system 2. On the other hand, in the manual driving mode, the vehicle system 2 is configured not to automatically perform the traveling controls, and the driver drives the vehicle 1 without the driving support of the vehicle system 2.

Also, the driving mode of the vehicle 1 may be switched by operating a driving mode changeover switch. In this case, the vehicle control unit 3 is configured to switch the driving mode of the vehicle 1 among the four driving modes (the full-automatic driving mode, the advanced driving support mode, the driving support mode, and the manual driving mode) in accordance with a driver's operation on the driving mode changeover switch. Also, the driving mode of the vehicle 1 may be automatically switched on the basis of information relating to a travel-allowed section where traveling of an automatic driving vehicle is allowed or a travel-prohibited section where the traveling of the automatic driving vehicle is prohibited or information relating to the external weather condition. In this case, the vehicle control unit 3 is configured to switch the driving mode of the vehicle 1, based on such information. Also, the driving mode of the vehicle 1 may be automatically switched by using a seating sensor, a face direction sensor, or the like. In this case, the vehicle control unit 3 is configured to switch the driving mode of the vehicle 1, based on an output signal from the seating sensor or the face direction sensor.

Figure 3A:
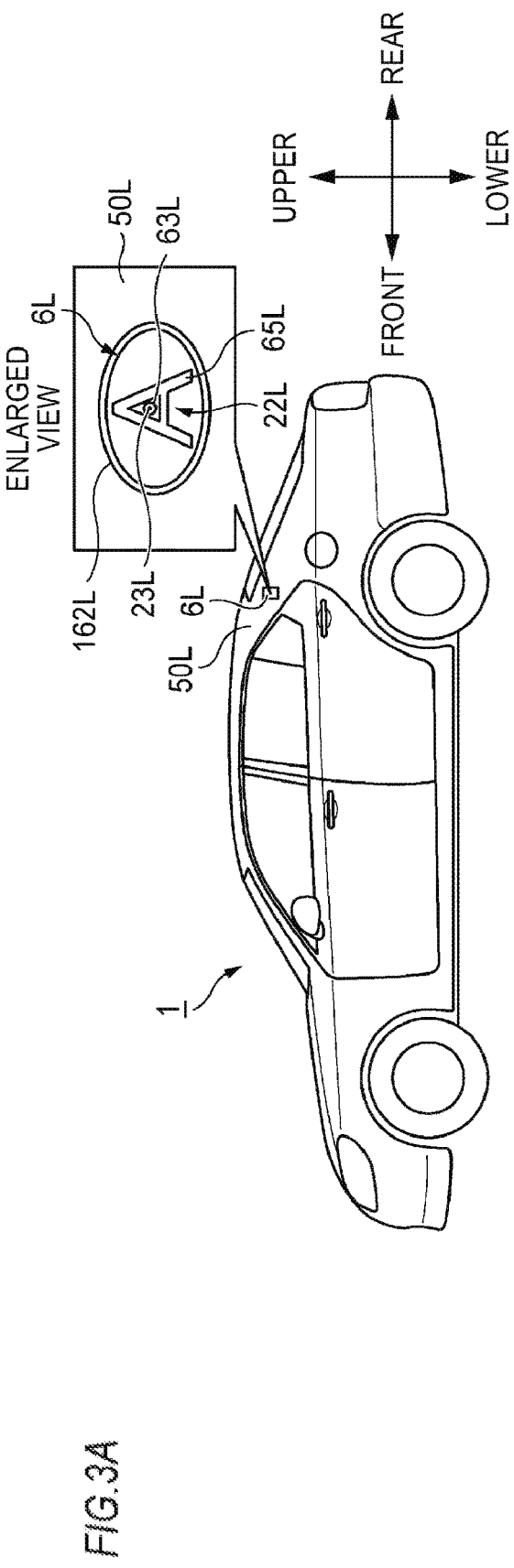
FIG. 3A is an enlarged front view of a left infrared camera module, depicting a left side of the vehicle.
Figure 3B:
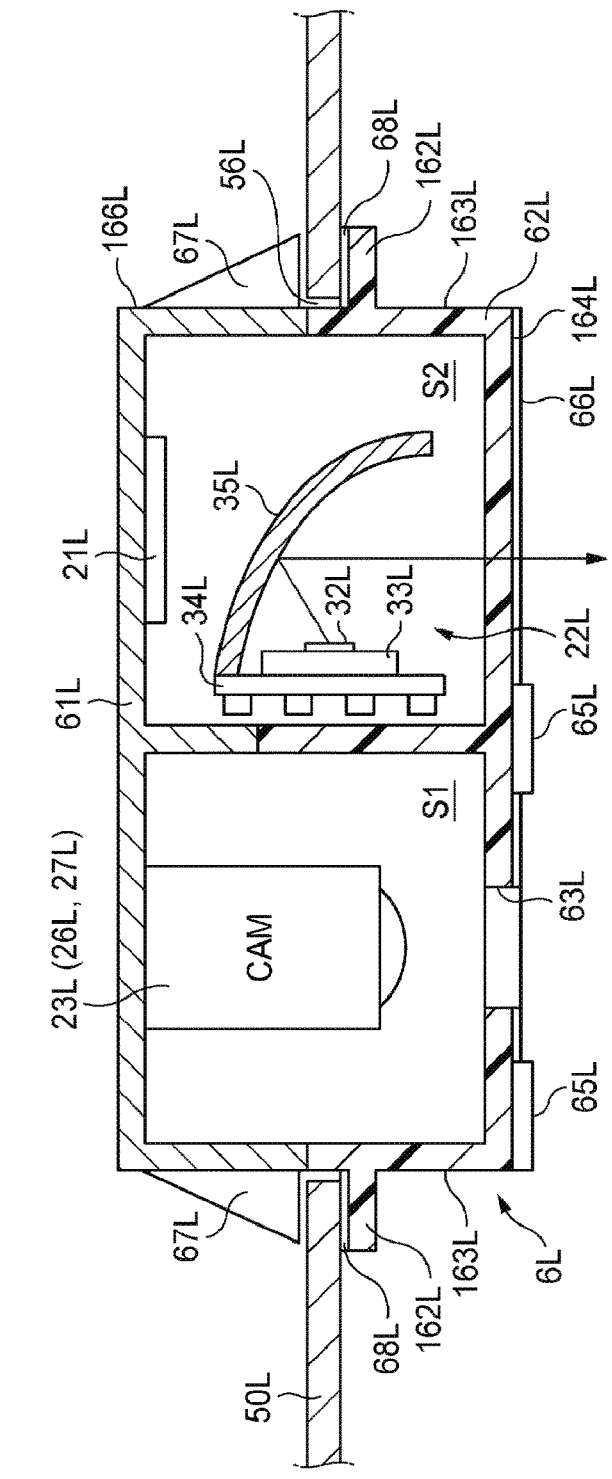
FIG. 3B is a sectional view of the left infrared camera module.

Subsequently, a specific structure of the left infrared camera module 6L is described with reference to FIG. 3. FIG. 3A is an enlarged front view of the left infrared camera module 6L, depicting a side view of the vehicle 1. FIG. 3B is a sectional view of the left infrared camera module 6L.

As shown in FIG. 3, the left infrared camera module 6L is mounted in a predetermined position of the left C pillar 50L of the vehicle 1. In particular, the left infrared camera module 6L is fitted in a through-hole 56L formed in a predetermined position of the left C pillar 50L. The left infrared camera module 6L includes the left camera 23L including the left infrared camera 26L and the left visible light camera 27L, the left infrared irradiation unit 22L, the control unit 21L, a housing 61L having an opening, and a cover 62L configured to cover the opening of the housing 61L. Meanwhile, in FIG. 3, it is assumed that the left infrared camera 26L and the left visible light camera 27L are integrally configured.

The left camera 23L, the left infrared irradiation unit 22L and the control unit 21L are disposed in a space formed by the housing 61L and the cover 62L. Specifically, the space formed by the housing 61L and the cover 62L has a first space S1, and a second space S2 isolated from the first space S1. While the left camera 23L is disposed in the first space S1, the left infrared irradiation unit 22L and the control unit 21L is disposed in the second space S2. According to the above configuration, since the first space S1 and the second space S2 are isolated from each other, it is possible to favorably prevent the infrared emitted from the left infrared irradiation unit 22L from being directly incident on the left infrared camera 26. In this way, it is possible to improve reliability of the infrared image data acquired by the left infrared camera 26L.

The left infrared irradiation unit 22L includes a heat sink 34L, a sub-mount 33L disposed on the heat sink 34L, an infrared light source 32L disposed on the sub-mount 33L, and a reflector 35L disposed on the heat sink 34L. The heat sink 34L is configured to radiate heat generated from the infrared light source 32L toward an outside. That is, the heat generated from the infrared light source 32L is radiated to an air of the second space S2 via the sub-mount 33L and the heat sink 34L.

The infrared light source 32L is configured, for example, by an infrared LED configured to emit the infrared. The reflector 35L is configured to reflect the infrared emitted from the infrared light source 32L toward an outside. The reflector 35L is configured, for example, as a parabolic reflector. In this case, the infrared light source 32L may be disposed in the vicinity of a focus of the reflector 35L, and the infrared emitted from the infrared light source 32L may be converted into substantially parallel light by the reflector 35L.

Although the control unit 21L is disposed in the second space S2, the arrangement position of the control unit 21L is not particularly limited. For example, the control unit 21L may be disposed outside the left infrared camera module 6L. In particular, the control unit 21L may be disposed in a predetermined position of the vehicle 1.

The housing 61L has a pair of lances 67L provided on an outer surface 166L of the housing 61L. The cover 62L functions as an infrared transmission filter configured to transmit the infrared (particularly, the near infrared). For this reason, the cover 62L is configured to transmit the infrared (near infrared) emitted from the left infrared irradiation unit 22L and not to transmit the visible light having a wavelength of at least 600 nm or less. Also, as seen from an outside of the vehicle 1, a color of the cover 62L is recognized as black. Also, the cover 62L, has a through-hole 63L formed in a position facing the left camera 23L. On the other hand, in a case in which the left camera 23L is configured only by the left infrared camera 26L, the cover 62L may not be formed with the through-hole 63L. Also, in a case in which the left infrared camera 26L and the left visible light camera 27L are separated from each other, the through-hole 63L or the visible light transmission filter may be formed in a position facing the left visible light camera 27L.

Also, the cover 62L has a collar part 162L protruding outward from an outer surface 163L of the cover 62L. A seat packing 68L is provided between the collar part 162L and the left C pillar 50L. Also, an emblem 65L of the vehicle 1 is formed on an outer surface 164L of the cover 62L. In this respect, in a case in which light of a red wavelength band is included in the infrared (near infrared) emitted from the left infrared irradiation unit 22L, a passenger in the other vehicle, a pedestrian and the like outside the vehicle 1 recognize the emitted infrared as reddish light. In the meantime, the pedestrian and the like pay more attention to the emblem 65L than the infrared (reddish light) emitted from the left infrared irradiation unit 22L. For this reason, it is possible to favorably prevent the pedestrian and the like from feeling uncomfortable about the infrared (reddish light) by the emblem 65L. In the present embodiment, "A" is shown as an example of the shape of the emblem 65L. However, the shape of the emblem 65L is not particularly limited.

Also, a coating layer 66L is formed on the outer surface 164L. The coating layer 66L may be a waterproof coating layer or a hydrophilic coating layer. In a case in which the coating layer 66L is a waterproof coating layer, droplets can be favorably prevented from attaching onto the outer surface 164L of the cover 62L. For this reason, the droplets are favorably prevented from being photographed by the left camera 23L, so that it is possible to improve the reliability of the image data acquired by the left camera 23L. On the other hand, in a case in which the coating layer 66L is a hydrophilic coating layer, water spots are favorably prevented from being formed on the outer surface 164L of the cover 62L. For this reason, the water spots are favorably prevented from being photographed by the left camera 23L, so that it is possible to improve the reliability of the image data acquired by the left camera 23L.

In the present embodiment, the specific structure of the left infrared camera module 6L is described. However, the right infrared camera module 6R has also a similar configuration to the left infrared camera module 6L. That is, the right infrared camera module 6R is fitted in a through-hole formed in a predetermined position of the right C pillar 50R of the vehicle 1. The right infrared camera module 6R includes the right camera 23R including the right infrared camera 26R and the right visible light camera 27R, the right infrared irradiation unit 22R, the control unit 21R, a housing (not shown) having an opening, and a cover (not shown) configured to cover the opening of the housing. Also, the right infrared camera module 6R includes an emblem (not shown) of the vehicle 1 formed on an outer surface of the cover, and a coating layer (not shown) formed on the outer surface of the cover. Also, the right infrared irradiation unit 22R has a similar configuration to the left infrared irradiation unit 22L shown in FIG. 3.

According to the present embodiment, even when the vehicle 1 is traveling in a dark environment, it is possible to detect the surrounding environment in the left side region of the vehicle 1 by using the left infrared camera 26L mounted to the left C pillar 50L of the vehicle 1, and to detect the surrounding environment in the right side region of the vehicle 1 by using the right infrared camera 26R mounted to the right C pillar 50R of the vehicle 1. Also, since the infrared other than the visible light is emitted toward the outside, as the light for the infrared camera, it is possible to prevent a situation in which the uncomfortable feeling is caused to the other vehicle, a pedestrian and the like outside the vehicle 1. In this way, it is possible to detect the surrounding environment in the side regions (the left side region and the right side region) of the vehicle 1 without causing the uncomfortable feeling to the other vehicle, a pedestrian and the like.

Also, since the left infrared camera module 6L (particularly, the left camera 23L) is mounted to the left C pillar 50L, foreign matters are difficult to attach to the left camera 23L. For this reason, it is not necessary to separately provide a cleaner device for cleaning the left camera 23L, so that it is possible to suppress the manufacturing cost of the left infrared camera module 6L. Also, since a malfunction of the left camera 23L due to attachment of the foreign matters thereon is difficult to occur, it is possible to improve the reliability of the left camera 23L.

As with the above descriptions, since the right infrared camera module 6R (particularly, the right camera 23R) is mounted to the right C pillar 50R, foreign matters are difficult to attach to the right camera 23R. For this reason, it is not necessary to separately provide a cleaner device for cleaning the right camera 23R, so that it is possible to suppress the manufacturing cost of the right infrared camera module 6R. Also, since a malfunction of the right camera 23R due to attachment of the foreign matters thereon is difficult to occur, it is possible to improve the reliability of the right camera 23R.

Also, in the present embodiment, the left infrared irradiation unit 22L, the left camera 23L, and the control unit 21L are accommodated in the space formed by the housing 61L and the cover 62L, and the left infrared camera system is packaged as one module. For this reason, it is possible to easily attach the left infrared camera module 6L to the vehicle 1.

Subsequently, processing of changing an intensity of the infrared to be emitted from the left infrared irradiation unit 22L and/or the right infrared irradiation unit 22R in correspondence to a traveling state of the vehicle 1 is described. In the meantime, for the sake of convenience of descriptions, the left infrared irradiation unit 22L and the right infrared irradiation unit 22R may be collectively referred to as "infrared irradiation unit 22", hereinbelow.

First Example: Processing of Changing Intensity of Infrared to be Emitted from Infrared Irradiation Unit 22 in Correspondence to Left Turn/Right Turn of Vehicle 1

Figure 5:
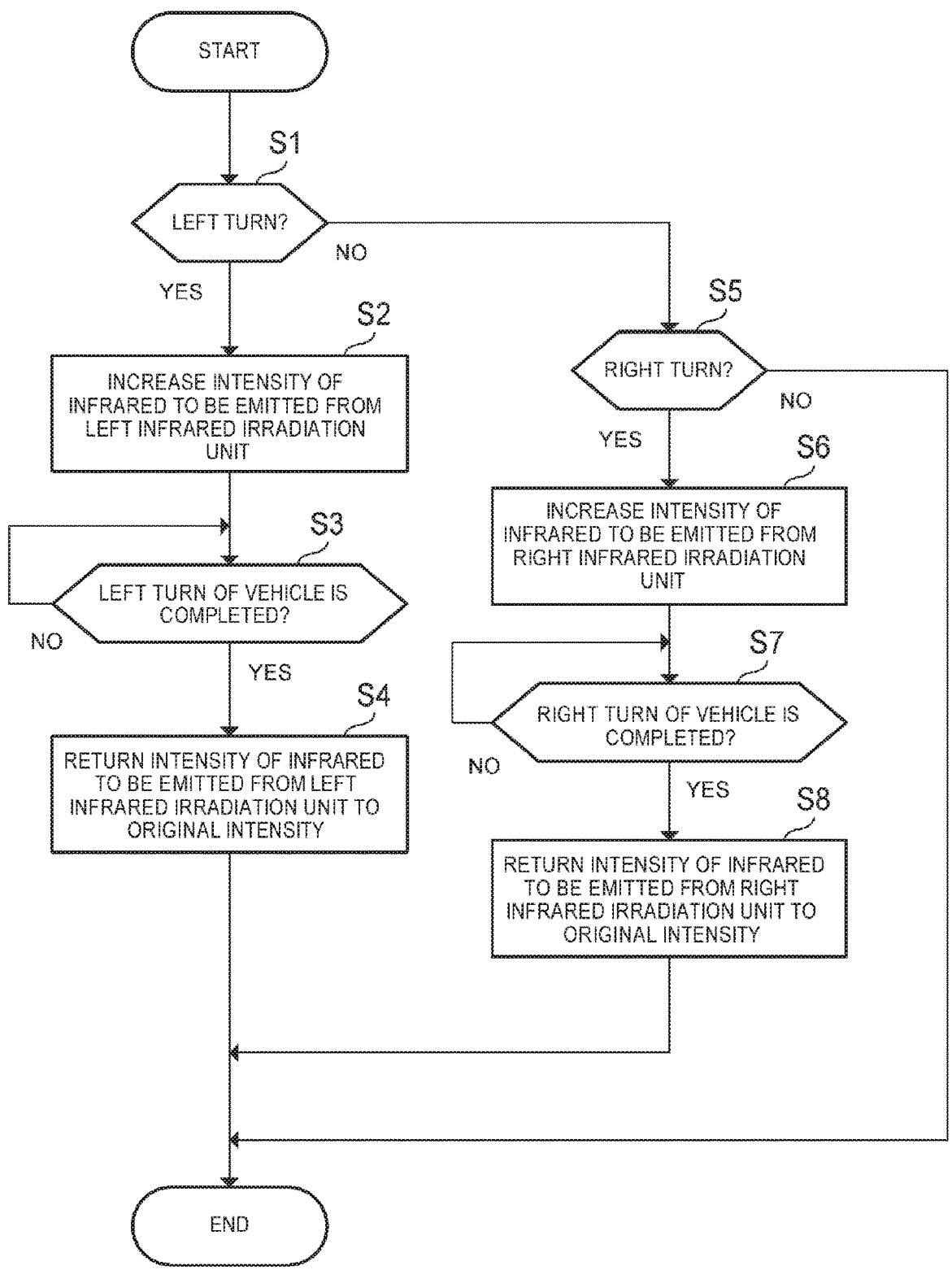
FIG. 5 is a flowchart depicting processing of increasing an intensity of infrared to be emitted from a left or right infrared irradiation unit, in correspondence to left turn or right turn of the vehicle.

As a first example, processing of changing the intensity of the infrared to be emitted from the infrared irradiation unit 22 in correspondence to the left turn/the right turn of the vehicle 1 is described with reference to FIG. 5. FIG. 5 is a flowchart depicting processing of increasing the intensity of the infrared to be emitted from the infrared irradiation unit 22, in correspondence to the left turn/right turn of the vehicle 1.

As shown in FIG. 5, when the vehicle 1 turns left (YES in step S1), the control unit 21L (refer to FIG. 2) increases the intensity of the infrared to be emitted from the left infrared irradiation unit 22L (step S2). Specifically, first, when it is determined that the vehicle 1 is made to turn left, the vehicle control unit 3 (refer to FIG. 2) transmits a trigger signal for instructing an increase in intensity of the infrared to the control unit 21L. Next, the control unit 21L increases the intensity of the infrared to be emitted from the left infrared irradiation unit 22L, in correspondence to the received trigger signal. In this respect, the control unit 21L sets the intensity of the infrared to be emitted from the left infrared irradiation unit 22L from a first intensity I1 to a second intensity I2 (>I1). The second intensity I2 is herein greater than the first intensity I1.

Next, when the left turn of the vehicle 1 is completed (YES in step S3), the control unit 21L returns the intensity of the infrared to be emitted from the left infrared irradiation unit 22L to the original intensity (step S4). Specifically, when it is determined that the left turn of the vehicle 1 is completed, the vehicle control unit 3 transmits a trigger signal for instructing to return the intensity of the infrared to the original intensity to the control unit 21L. Next, the control unit 21L returns the intensity of the infrared to be emitted from the left infrared irradiation unit 22L to the original intensity, in correspondence to the received trigger signal. In this respect, the control unit 21L sets the intensity of the infrared to be emitted from the left infrared irradiation unit 22L from the second intensity I2 to the first intensity I1. On the other hand, when the left turn of the vehicle 1 is not completed (NO in step S3), the vehicle control unit 3 suspends the transmission of the trigger signal to the control unit 21L until the left turn of the vehicle 1 is completed.

Also, when the vehicle 1 turns right (YES in step S5), the control unit 21L increases the intensity of the infrared to be emitted from the right infrared irradiation unit 22R (step S6). Specifically, first, when it is determined that the vehicle 1 is made to turn right, the vehicle control unit 3 transmits a trigger signal for instructing an increase in intensity of the infrared to the control unit 21R. Next, the control unit 21R increases the intensity of the infrared to be emitted from the right infrared irradiation unit 22R, in correspondence to the received trigger signal. In this respect, the control unit 21R sets the intensity of the infrared to be emitted from the right infrared irradiation unit 22R from the first intensity I1 to the second intensity I2.

Next, when the right turn of the vehicle 1 is completed (YES in step S7), the control unit 21R returns the intensity of the infrared to be emitted from the right infrared irradiation unit 22R to the original intensity (step S8). Specifically, when it is determined that the right turn of the vehicle 1 is completed, the vehicle control unit 3 transmits a trigger signal for instructing to return the intensity of the infrared to the original intensity to the control unit 21R. Next, the control unit 21R returns the intensity of the infrared to be emitted from the right infrared irradiation unit 22R to the original intensity, in correspondence to the received trigger signal. In this respect, the control unit 21R sets the intensity of the infrared to be emitted from the right infrared irradiation unit 22R from the second intensity I2 to the first intensity I1. On the other hand, when the right turn of the vehicle 1 is not completed (NO in step S5), the vehicle control unit 3 suspends the transmission of the trigger signal to the control unit 21R until the right turn of the vehicle 1 is completed. Also, when the vehicle 1 does not turn left or right (NO in step S5), the intensity of the infrared to be emitted from the infrared irradiation unit 22 is not changed.

According to the first example, the intensity of the infrared to be emitted from the left infrared irradiation unit 22L is increased, in correspondence to the left turn of the vehicle 1. In this way, since the intensity of the reflected light reflected by a target object in the left side region of the vehicle 1 is increased, it is possible to securely detect the surrounding environment in the detection range of the left infrared camera 26L when the vehicle 1 turns left. On the other hand, the intensity of the infrared to be emitted from the right infrared irradiation unit 22R is increased, in correspondence to the right turn of the vehicle 1. In this way, since the intensity of the reflected light reflected by a target object in the right side region of the vehicle 1 is increased, it is possible to securely detect the surrounding environment in the detection range of the right infrared camera 26R when the vehicle 1 turns right.

Meanwhile, in the present example, when the vehicle 1 turns left, only the intensity of the infrared to be emitted from the left infrared irradiation unit 22L is increased, and when the vehicle 1 turns right, only the intensity of the infrared to be emitted from the right infrared irradiation unit 22R is increased. However, the present example is not limited thereto. For example, in step S2, the control unit 21L may increase the intensity of the infrared to be emitted from the left infrared irradiation unit 22L, and the control unit 21R may increase the intensity of the infrared to be emitted from the right infrared irradiation unit 22R. In this respect, while the control unit 21L may set the intensity of the infrared to be emitted from the left infrared irradiation unit 22L from the first intensity I1 to a third intensity I3, the control unit 21R may set the intensity of the infrared to be emitted from the right infrared irradiation unit 22R from the first intensity I1 to the second intensity I2. Herein, it is assumed that a relation of the third intensity I3>the second intensity I2>the first intensity I1 is satisfied.

Likewise, in step S6, the control unit 21R may increase the intensity of the infrared to be emitted from the right infrared irradiation unit 22R, and the control unit 21L may increase the intensity of the infrared to be emitted from the left infrared irradiation unit 22L. In this respect, while the control unit 21R may set the intensity of the infrared to be emitted from the right infrared irradiation unit 22R from the first intensity I1 to the third intensity I3, the control unit 21L may set the intensity of the infrared to be emitted from the left infrared irradiation unit 22L from the first intensity I1 to the second intensity I2. Herein, it is assumed that a relation of the third intensity I3>the second intensity I2>the first intensity I1 is satisfied.

Second Example Processing of Changing Intensity of Infrared to be Emitted from Infrared Irradiation Unit 22 in Correspondence to Left Curve Traveling/Right Curve Traveling of Vehicle 1

Figure 6:
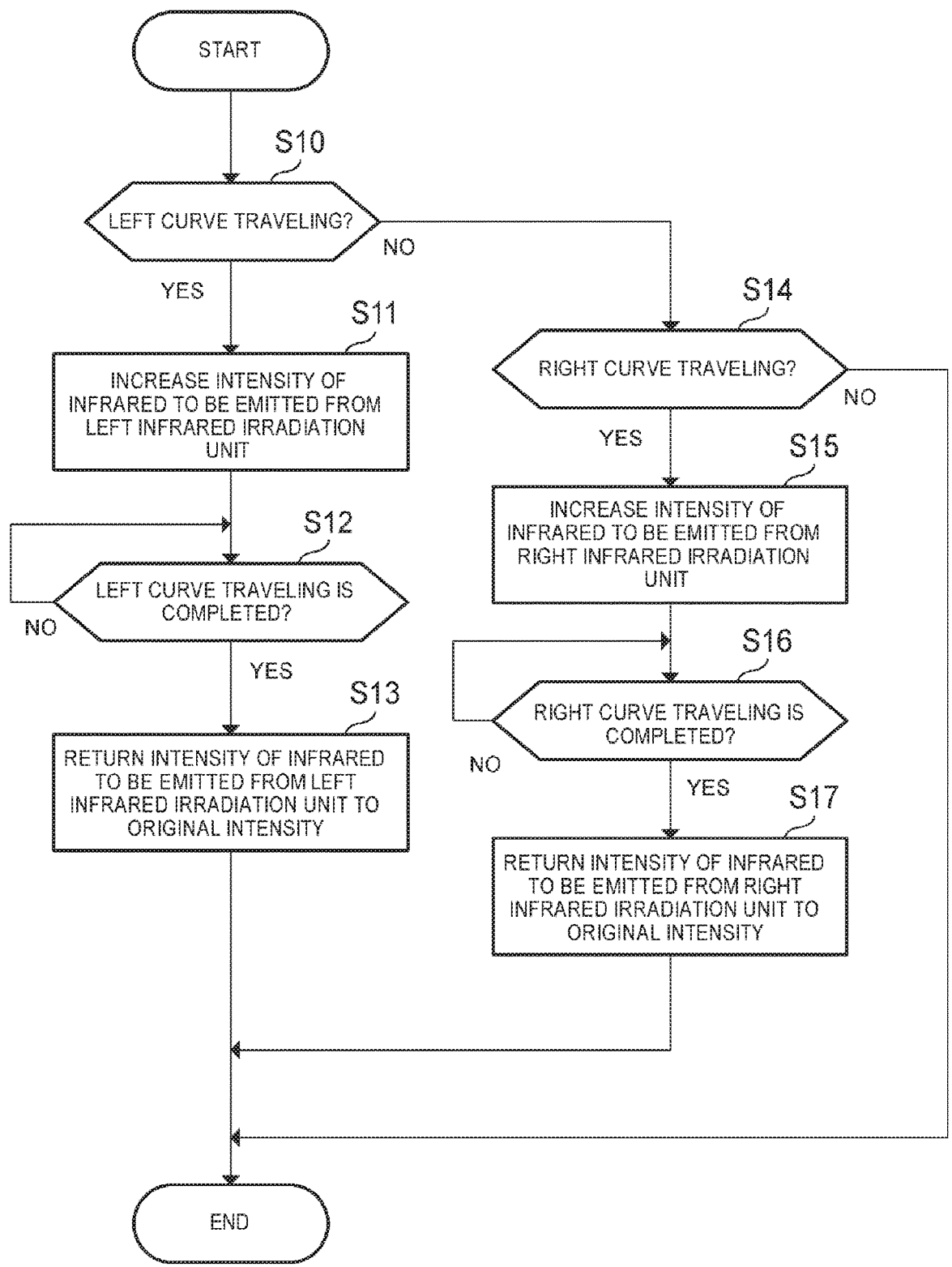
FIG. 6 is a flowchart depicting processing of increasing the intensity of the infrared to be emitted from the left or right infrared irradiation unit, in correspondence to left curve traveling or right curve traveling of the vehicle.

Subsequently, as a second example, processing of changing the intensity of the infrared to be emitted from the infrared irradiation unit 22 in correspondence to the left curve traveling the right curve traveling of the vehicle 1 is described with reference to FIG. 6. FIG. 6 is a flowchart depicting processing of increasing the intensity of the infrared to be emitted from the infrared irradiation unit 22, in correspondence to the left curve traveling or the right curve traveling of the vehicle 1.

As shown in FIG. 6, while the vehicle 1 is traveling on the left curve (YES in step S10), the control unit 21L increases the intensity of the infrared to be emitted from the left infrared irradiation unit 22L (step S11). Specifically, first, when it is determined that the vehicle 1 is traveling on the left curve, the vehicle control unit 3 transmits a trigger signal for instructing an increase in intensity of the infrared to the control unit 21L. Next, the control unit 21L increases the intensity of the infrared to be emitted from the left infrared irradiation unit 22L, in correspondence to the received trigger signal. In this respect, the control unit 21L sets the intensity of the infrared to be emitted from the left infrared irradiation unit 22L from the first intensity I1 to the second intensity I2 (>I1).

Next, when the left curve traveling of the vehicle 1 is completed (YES in step S12), the control unit 21L returns the intensity of the infrared to be emitted from the left infrared irradiation unit 22L to the original intensity (step S13). Specifically, when it is determined that the left curve traveling of the vehicle 1 is completed, the vehicle control unit 3 transmits a trigger signal for instructing to return the intensity of the infrared to the original intensity to the control unit 21L. Next, the control unit 21L returns the intensity of the infrared to be emitted from the left infrared irradiation unit 22L to the original intensity, in correspondence to the received trigger signal. In this respect, the control unit 21L sets the intensity of the infrared to be emitted from the left infrared irradiation unit 22L from the second intensity I2 to the first intensity I1. On the other hand, when the left curve traveling of the vehicle 1 is not completed (NO in step S12), the vehicle control unit 3 suspends the transmission of the trigger signal to the control unit 21L until the left curve traveling of the vehicle 1 is completed.

Also, while the vehicle 1 is traveling on the right curve (YES in step S14), the control unit 21R increases the intensity of the infrared to be emitted from the right infrared irradiation unit 22R (step S15). Specifically, first, when it is determined that the vehicle 1 is traveling on the right curve, the vehicle control unit 3 transmits a trigger signal for instructing an increase in intensity of the infrared to the control unit 21R. Next, the control unit 21R increases the intensity of the infrared to be emitted from the right infrared irradiation unit 22R, in correspondence to the received trigger signal. In this respect, the control unit 21R sets the intensity of the infrared to be emitted from the right infrared irradiation unit 22R from the first intensity I1 to the second intensity I2.

Next, when the right curve traveling of the vehicle 1 is completed (YES in step S16), the control unit 21R returns the intensity of the infrared to be emitted from the right infrared irradiation unit 22R to the original intensity (step S17). Specifically, when it is determined that the right curve traveling of the vehicle 1 is completed, the vehicle control unit 3 transmits a trigger signal for instructing to return the intensity of the infrared to the original intensity to the control unit 21R. Next, the control unit 21R returns the intensity of the infrared to be emitted from the right infrared irradiation unit 22R to the original intensity, in correspondence to the received trigger signal. In this respect, the control unit 21R sets the intensity of the infrared to be emitted from the right infrared irradiation unit 22R from the second intensity I2 to the first intensity I1. On the other hand, when the right curve traveling of the vehicle 1 is not completed (NO in step S16), the vehicle control unit 3 suspends the transmission of the trigger signal to the control unit 21R until the right curve traveling of the vehicle 1 is completed. Also, when the vehicle 1 is not traveling on the left curve or the right curve (NO in step S14), the intensity of the infrared to be emitted from the infrared irradiation unit 22 is not changed.

According to the second example, the intensity of the infrared to be emitted from the left infrared irradiation unit 22L is increased, in correspondence to the left curve traveling of the vehicle 1. In this way, since the intensity of the reflected light reflected by a target object in the left side region of the vehicle 1 is increased, it is possible to securely detect the surrounding environment in the detection range of the left infrared camera 26L when the vehicle 1 is traveling on the left curve. On the other hand, the intensity of the infrared to be emitted from the right infrared irradiation unit 22R is increased, in correspondence to the right curve traveling of the vehicle 1. In this way, since the intensity of the reflected light reflected by a target object in the right side region of the vehicle 1 is increased, it is possible to securely detect the surrounding environment in the detection range of the right infrared camera 26R when the vehicle 1 is traveling on the right curve.

Meanwhile, in the present example, when the vehicle 1 is traveling on the left curve, only the intensity of the infrared to be emitted from the left infrared irradiation unit 22L is increased, and when the vehicle 1 is traveling on the right curve, only the intensity of the infrared to be emitted from the right infrared irradiation unit 22R is increased. However, the present example is not limited thereto. For example, in step S11, the control unit 21L may increase the intensity of the infrared to be emitted from the left infrared irradiation unit 22L, and the control unit 21R may increase the intensity of the infrared to be emitted from the right infrared irradiation unit 22R. In this respect, while the control unit 21L may set the intensity of the infrared to be emitted from the left infrared irradiation unit 22L from the first intensity I1 to the third intensity I3, the control unit 21R may set the intensity of the infrared to be emitted from the right infrared irradiation unit 22R from the first intensity I1 to the second intensity I2. Herein, it is assumed that a relation of the third intensity I3>the second intensity I2>the first intensity I1 is satisfied.

Likewise, in step S15, the control unit 21R may increase the intensity of the infrared to be emitted from the right infrared irradiation unit 22R, and the control unit 21L may increase the intensity of the infrared to be emitted from the left infrared irradiation unit 22L. In this respect, while the control unit 21R may set the intensity of the infrared to be emitted from the right infrared irradiation unit 22R from the first intensity I1 to the third intensity I3, the control unit 21L may set the intensity of the infrared to be emitted from the left infrared irradiation unit 22L from the first intensity I1 to the second intensity I2. Herein, it is assumed that a relation of the third intensity I3>the second intensity I2>the first intensity I1 is satisfied.

Third Example Processing of Changing Intensity of Infrared to be Emitted from Infrared Irradiation Unit 22 in Correspondence to Traffic Lane Change of Vehicle 1

Figure 7:
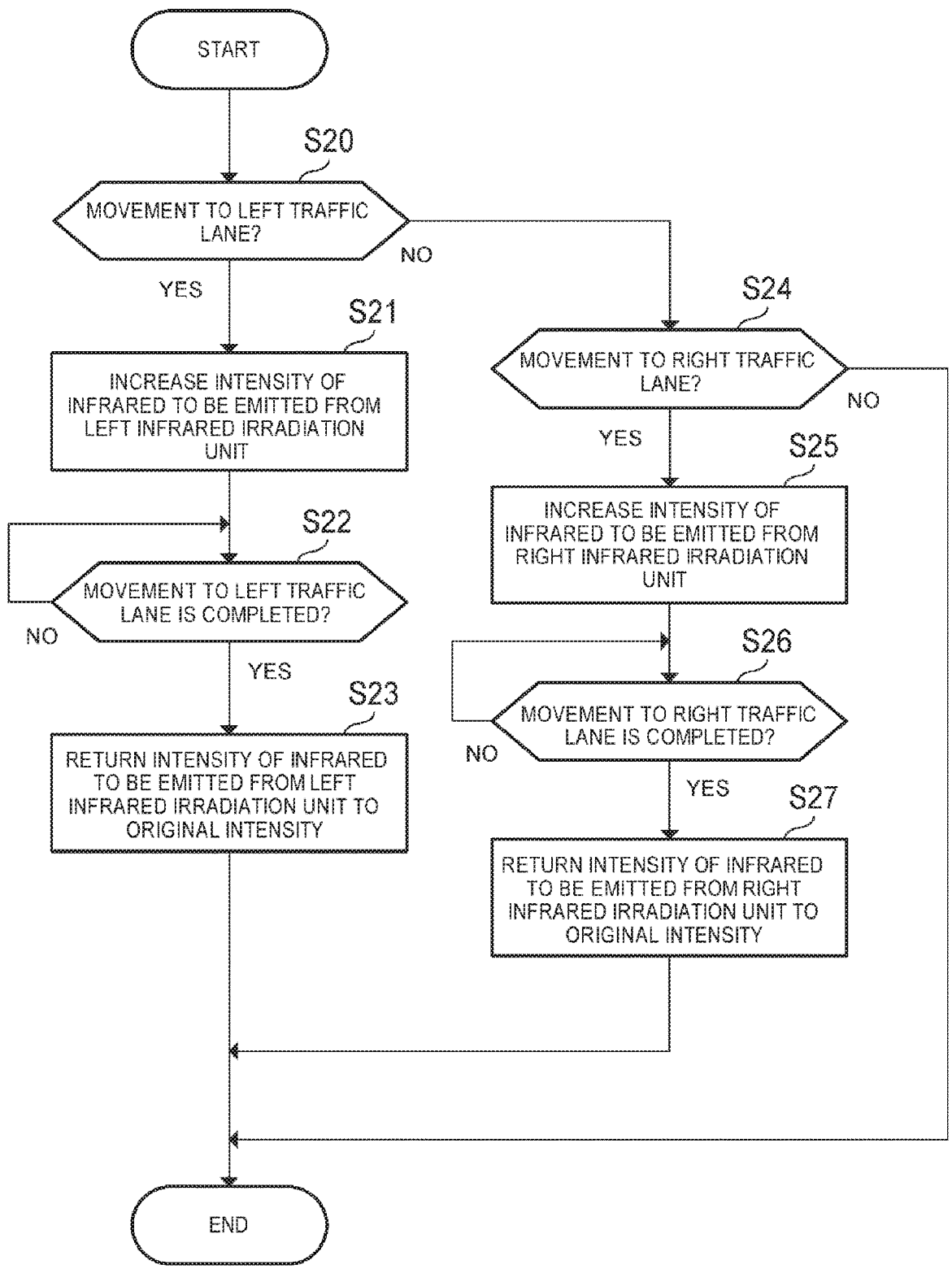
FIG. 7 is a flowchart depicting processing of increasing the intensity of the infrared to be emitted from the left or right infrared irradiation unit, in correspondence to movement of the vehicle to the left or right traffic lane.

Subsequently, as a third example, processing of changing the intensity of the infrared to be emitted from the infrared irradiation unit 22 in correspondence to traffic lane change (the change to a left traffic lane or a right traffic lane) of the vehicle 1 is described with reference to FIG. 7. FIG. 7 is a flowchart depicting processing of increasing the intensity of the infrared to be emitted from the infrared irradiation unit 22, in correspondence to movement of the vehicle 1 to the left traffic lane or the right traffic lane.

As shown in FIG. 7, when the vehicle 1 moves to the left traffic lane (YES in step S20), the control unit 21L increases the intensity of the infrared to be emitted from the left infrared irradiation unit 22L (step S21). Specifically, first, when it is determined that the vehicle 1 is made to move to the left traffic lane, the vehicle control unit 3 transmits a trigger signal for instructing an increase in intensity of the infrared to the control unit 21L. Next, the control unit 21L increases the intensity of the infrared to be emitted from the left infrared irradiation unit 22L, in correspondence to the received trigger signal. In this respect, the control unit 21L sets the intensity of the infrared to be emitted from the left infrared irradiation unit 22L from the first intensity I1 to the second intensity I2 (>I1).

Next, when the movement of the vehicle 1 to the left traffic lane is completed (YES in step S22), the control unit 21L returns the intensity of the infrared to be emitted from the left infrared irradiation unit 22L to the original intensity (step S23). Specifically, when it is determined that the movement of the vehicle 1 to the left traffic lane is completed, the vehicle control unit 3 transmits a trigger signal for instructing to return the intensity of the infrared to the original intensity to the control unit 21L. Next, the control unit 21L returns the intensity of the infrared to be emitted from the left infrared irradiation unit 22L to the original intensity, in correspondence to the received trigger signal. In this respect, the control unit 21L sets the intensity of the infrared to be emitted from the left infrared irradiation unit 22L from the second intensity I2 to the first intensity I1. On the other hand, when the movement of the vehicle 1 to the left traffic lane is not completed (NO in step S22), the vehicle control unit 3 suspends the transmission of the trigger signal to the control unit 21L until the movement of the vehicle 1 to the left traffic lane is completed.

Also, when the vehicle 1 moves to the right traffic lane (YES in step S24), the control unit 21L increases the intensity of the infrared to be emitted from the right infrared irradiation unit 22R (step S25). Specifically, first, when it is determined that the vehicle 1 is made to move to the right traffic lane, the vehicle control unit 3 transmits a trigger signal for instructing an increase in intensity of the infrared to the control unit 21R. Next, the control unit 21R increases the intensity of the infrared to be emitted from the right infrared irradiation unit 22R, in correspondence to the received trigger signal. In this respect, the control unit 21R sets the intensity of the infrared to be emitted from the right infrared irradiation unit 22R from the first intensity I1 to the second intensity I2.

Next, when the movement of the vehicle 1 to the right traffic lane is completed (YES in step S26), the control unit 21R returns the intensity of the infrared to be emitted from the right infrared irradiation unit 22R to the original intensity (step S27). Specifically, when it is determined that the movement of the vehicle 1 to the right traffic lane is completed, the vehicle control unit 3 transmits a trigger signal for instructing to return the intensity of the infrared to the original intensity to the control unit 21R. Next, the control unit 21R returns the intensity of the infrared to be emitted from the right infrared irradiation unit 22R to the original intensity, in correspondence to the received trigger signal. In this respect, the control unit 21R sets the intensity of the infrared to be emitted from the right infrared irradiation unit 22R from the second intensity I2 to the first intensity I1. On the other hand, when the movement of the vehicle 1 to the right traffic lane is not completed (NO in step S26), the vehicle control unit 3 suspends the transmission of the trigger signal to the control unit 21R until the right turn of the vehicle 1 is completed. Also, when the vehicle 1 does not change the traffic lane (NO in step S24), the intensity of the infrared to be emitted from the infrared irradiation unit 22 is not changed.

According to the third example, the intensity of the infrared to be emitted from the left infrared irradiation unit 22L is increased, in correspondence to the movement of the vehicle 1 to the left traffic lane. In this way, since the intensity of the reflected light reflected by a target object in the left side region of the vehicle 1 is increased, it is possible to securely detect the surrounding environment in the detection range of the left infrared camera 26L when the vehicle 1 moves to the left traffic lane. On the other hand, the intensity of the infrared to be emitted from the right infrared irradiation unit 22R is increased, in correspondence to the movement of the vehicle 1 to the right traffic lane. In this way, since the intensity of the reflected light reflected by a target object in the right side region of the vehicle 1 is increased, it is possible to securely detect the surrounding environment in the detection range of the right infrared camera 26R when the vehicle 1 moves to the right traffic lane.

Figure 8:
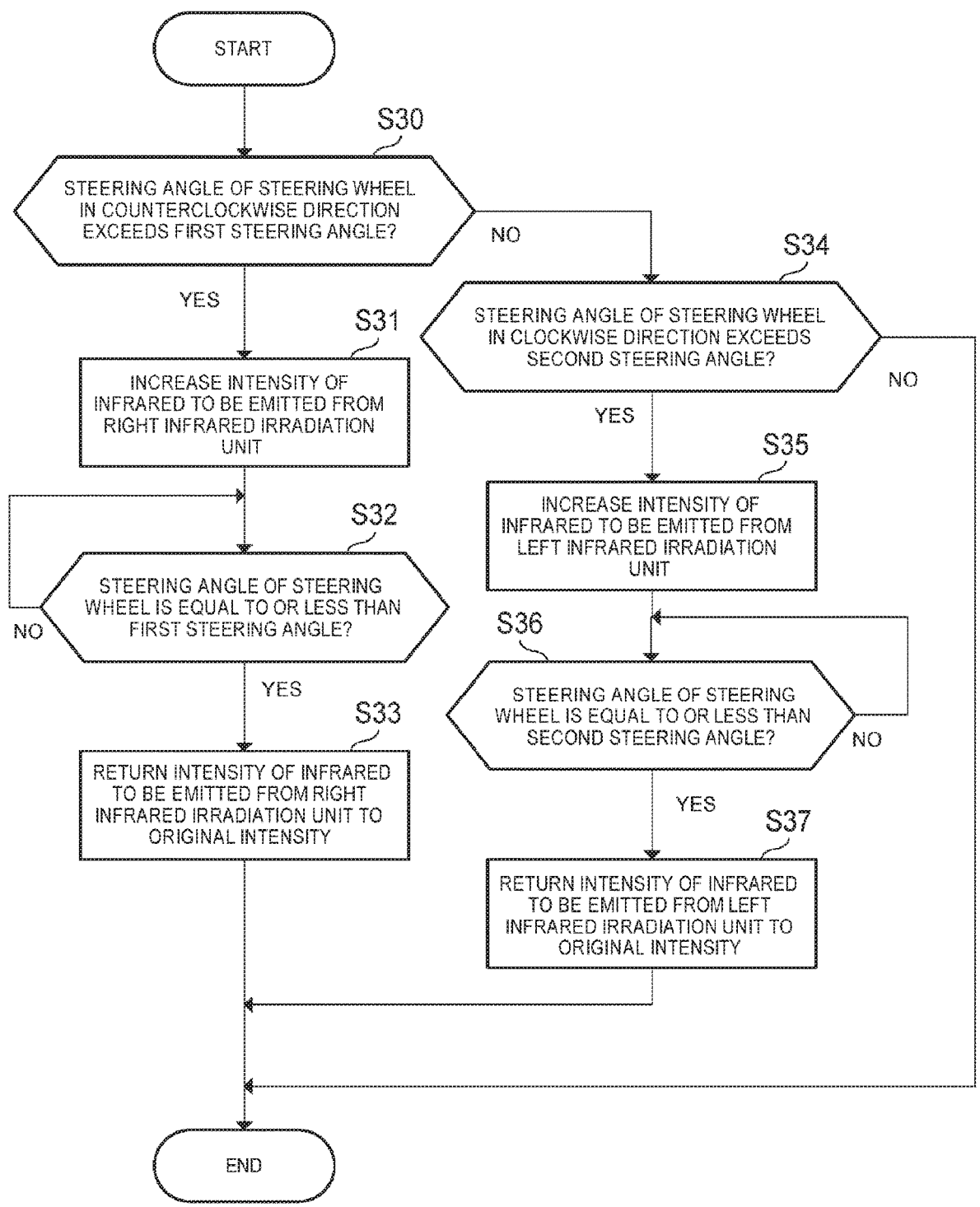
FIG. 8 is a flowchart depicting processing of increasing the intensity of the infrared to be emitted from the left or right infrared irradiation unit, in correspondence to a steering angle of a steering wheel.

Fourth Example Processing of Changing Intensity of Infrared to be Emitted from Infrared Irradiation Unit 22 in Correspondence to Steering Angle of Steering Wheel Subsequently, as a fourth example, processing of changing the intensity of the infrared to be emitted from the infrared irradiation unit 22 in correspondence to a steering angle (rotating angle) of the steering wheel is described with reference to FIG. 8. FIG. 8 is a flowchart depicting processing of increasing the intensity of the infrared to be emitted from the infrared irradiation unit 22, in correspondence to the steering wheel. In the present example, it is assumed that the vehicle 1 is traveling in the manual driving mode or driving support mode. That is, it is assumed that the traveling control on the vehicle 1 is performed by the driver.

As shown in FIG. 8, in step S30, the vehicle control unit 3 determines whether a steering angle θ of the steering wheel of the vehicle 1 in a counterclockwise direction exceeds a first steering angle $\theta_{th1}$. When it is determined that the steering angle θ exceeds the first steering angle $\theta_{th1}$ (YES in step S30), the vehicle control unit 3 transmits a trigger signal for instructing an increase in intensity of the infrared to the control unit 21R. Next, the control unit 21R increases the intensity of the infrared to be emitted from the right infrared irradiation unit 22R, in correspondence to the received trigger signal (step S31). In this respect, the control unit 21R sets the intensity of the infrared to be emitted from the right infrared irradiation unit 22R from the first intensity I1 to the second intensity I2 (>I1).

Next, in step S32, the vehicle control unit 3 determines whether the steering angle θ in the counterclockwise direction is equal to or less than the first steering angle $\theta_{th1}$. When it is determined that the steering angle θ is equal to or less than the first steering angle $\theta_{th1}$ (YES in step S32), the vehicle control unit 3 transmits a trigger signal for instructing to return the intensity of the infrared to the original intensity to the control unit 21R. Next, the control unit 21R returns the intensity of the infrared to be emitted from the right infrared irradiation unit 22R to the original intensity, in correspondence to the received trigger signal (step S33). In this respect, the control unit 21R sets the intensity of the infrared to be emitted from the right infrared irradiation unit 22R from the second intensity I2 to the first intensity I1. In the meantime, the vehicle control unit 3 suspends the transmission of the trigger signal to the control unit 21R until the steering angle θ is equal to or less than the first steering angle $\theta_{th1}$ (NO in step S32).

Also, in step S34, the vehicle control unit 3 determines whether a steering angle θ of the steering wheel of the vehicle 1 in a clockwise direction exceeds a second steering angle $\theta_{th2}$. When it is determined that the steering angle θ exceeds the second steering angle $\theta_{th2}$ (YES in step S34), the vehicle control unit 3 transmits a trigger signal for instructing an increase in intensity of the infrared to the control unit 21L. Next, the control unit 21L increases the intensity of the infrared to be emitted from the left infrared irradiation unit 22L, in correspondence to the received trigger signal (step S35). For example, the control unit 21L sets the intensity of the infrared to be emitted from the left infrared irradiation unit 22L from the first intensity I1 to the second intensity I2 (>I1).

Next, in step S36, the vehicle control unit 3 determines whether the steering angle θ in the clockwise direction is equal to or less than the second steering angle $\theta_{th2}$. When it is determined that the steering angle θ is equal to or less than the second steering angle $\theta_{th2}$ (YES in step S36), the vehicle control unit 3 transmits a trigger signal for instructing for returning the intensity of the infrared to the original intensity to the control unit 21L. Here, the second steering angle $\theta_{th2}$ may be the same or different from the first steering angle $\theta_{th1}$. Next, the control unit 21L returns the intensity of the infrared to be emitted from the left infrared irradiation unit 22L to the original intensity, in correspondence to the received trigger signal (step S37). In this respect, the control unit 21L sets the intensity of the infrared to be emitted from the left infrared irradiation unit 22L from the second intensity I2 to the first intensity I1. In the meantime, the vehicle control unit 3 suspends the transmission of the trigger signal to the control unit 21L until the steering angle θ is equal to or less than the second steering angle $\theta_{th2}$ (NO in step S36).

According to the fourth example, the intensity of the infrared to be emitted from the right infrared irradiation unit 22R is increased, in correspondence to the steering angle (rotating angle) of the steering wheel in the counterclockwise direction. In this way, since the intensity of the reflected light reflected by a target object in the right side region of the vehicle 1 is increased, it is possible to securely detect the surrounding environment in the detection range of the right infrared camera 26R when the vehicle 1 turns to the left (left turn or left curve traveling). That is, when the vehicle 1 turns to the left, it is possible to securely detect the surrounding environment in the right side region opposite to the left side region of the vehicle 1 in which the driver faces.

Also, the intensity of the infrared to be emitted from the left infrared irradiation unit 22L is increased, in correspondence to the steering angle (rotating angle) of the steering wheel in the clockwise direction. In this way, since the intensity of the reflected light reflected by a target object in the left side region of the vehicle 1 is increased, it is possible to securely detect the surrounding environment in the detection range of the left infrared camera 26L when the vehicle 1 turns to the right (right turn or right curve traveling). That is, when the vehicle 1 turns to the right, it is possible to securely detect the surrounding environment in the left side region opposite to the right side region of the vehicle 1 in which the driver faces.

In the present example, the processing of step S33 or step S37 may be executed when the steering angle θ of the steering wheel in the counterclockwise direction becomes 0* (original position).

Figure 9:
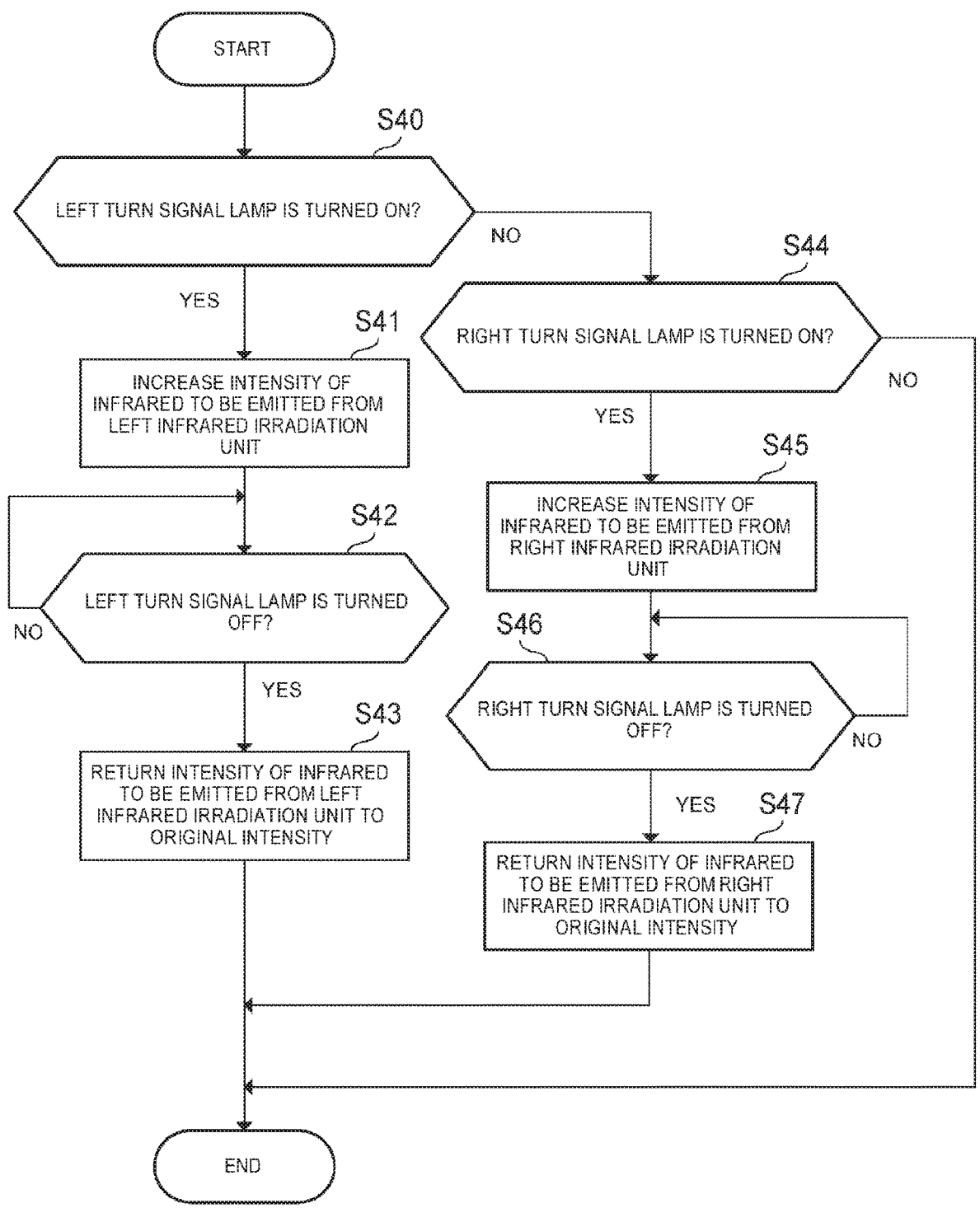
FIG. 9 is a flowchart depicting processing of increasing the intensity of the infrared to be emitted from the left or right infrared irradiation unit, in correspondence to a left or right turn signal lamp of the vehicle.

Fifth Example Processing of Changing Intensity of Infrared to be Emitted from Infrared Irradiation Unit 22 in Correspondence to Lighting of Turn Signal Lamp Subsequently, as a fifth example, processing of changing the intensity of the infrared to be emitted from the infrared irradiation unit 22 in correspondence to the turn signal lamp (left turn signal lamp or right turn signal lamp) of the vehicle 1 is described with reference to FIG. 9. FIG. 9 is a flowchart depicting processing of increasing the intensity of the infrared to be emitted from the infrared irradiation unit 22, in correspondence to lighting of the left turn signal lamp or right turn signal lamp of the vehicle 1.

As shown in FIG. 9, when the left turn signal lamp is turned on (YES in step S40), the control unit 21L increases the intensity of the infrared to be emitted from the left infrared irradiation unit 22L (step S41). Specifically, first, when it is determined to turn on the left turn signal lamp, the vehicle control unit 3 transmits a trigger signal for instructing an increase in intensity of the infrared to the control unit 21L. Next, the control unit 21L increases the intensity of the infrared to be emitted from the left infrared irradiation unit 22L, in correspondence to the received trigger signal. In this respect, the control unit 21L sets the intensity of the infrared to be emitted from the left infrared irradiation unit 22L from the first intensity I1 to the second intensity I2 (>I1).

Next, when the left turn signal lamp of the vehicle 1 is turned off (YES in step S42), the control unit 21L returns the intensity of the infrared to be emitted from the left infrared irradiation unit 22L to the original intensity (step S43). Specifically, when it is determined to turn off the left turn signal lamp, the vehicle control unit 3 transmits a trigger signal for instructing to return the intensity of the infrared to the original intensity to the control unit 21L. Next, the control unit 21L returns the intensity of the infrared to be emitted from the left infrared irradiation unit 22L to the original intensity, in correspondence to the received trigger signal. In this respect, the control unit 21L sets the intensity of the infrared to be emitted from the left infrared irradiation unit 22L from the second intensity I2 to the first intensity I1. In the meantime, the vehicle control unit 3 suspends the transmission of the trigger signal to the control unit 21L until it is determined to turn off the left turn signal lamp (NO in step S42).

Also, when the right turn signal lamp of the vehicle 1 is turned on (YES in step S44), the control unit 21R increases the intensity of the infrared to be emitted from the right infrared irradiation unit 22R (step S45). Specifically, first, when it is determined to turn on the right turn signal lamp, the vehicle control unit 3 transmits a trigger signal for instructing an increase in intensity of the infrared to the control unit 21R. Next, the control unit 21R increases the intensity of the infrared to be emitted from the right infrared irradiation unit 22R, in correspondence to the received trigger signal. In this respect, the control unit 21R sets the intensity of the infrared to be emitted from the right infrared irradiation unit 22R from the first intensity I1 to the second intensity I2.

Next, when the right turn signal lamp is turned off (YES in step S46), the control unit 21R returns the intensity of the infrared to be emitted from the right infrared irradiation unit 22R to the original intensity (step S47). Specifically, when it is determined to turn off the right turn signal lamp, the vehicle control unit 3 transmits a trigger signal for instructing to return the intensity of the infrared to the original intensity to the control unit 21R. Next, the control unit 21R returns the intensity of the infrared to be emitted from the right infrared irradiation unit 22R to the original intensity, in correspondence to the received trigger signal. In this respect, the control unit 21R sets the intensity of the infrared to be emitted from the right infrared irradiation unit 22RL from the second intensity I2 to the first intensity I1. In the meantime, the vehicle control unit 3 suspends the transmission of the trigger signal to the control unit 21R until it is determined to turn off the right turn signal lamp (NO in step S46).

According to the fifth example, the intensity of the infrared to be emitted from the left infrared irradiation unit 22L is increased, in correspondence to the lighting of the left turn signal lamp. In this way, since the intensity of the reflected light reflected by a target object in the left side region of the vehicle 1 is increased, it is possible to securely detect the surrounding environment in the detection range of the left infrared camera 26L when the vehicle 1 changes leftward the pathway. On the other hand, the intensity of the infrared to be emitted from the right infrared irradiation unit 22R is increased, in correspondence to the lighting of the right turn signal lamp. In this way, since the intensity of the reflected light reflected by a target object in the right side region of the vehicle 1 is increased, it is possible to securely detect the surrounding environment in the detection range of the right infrared camera 26R when the vehicle 1 changes rightward the pathway.

Figure 10:
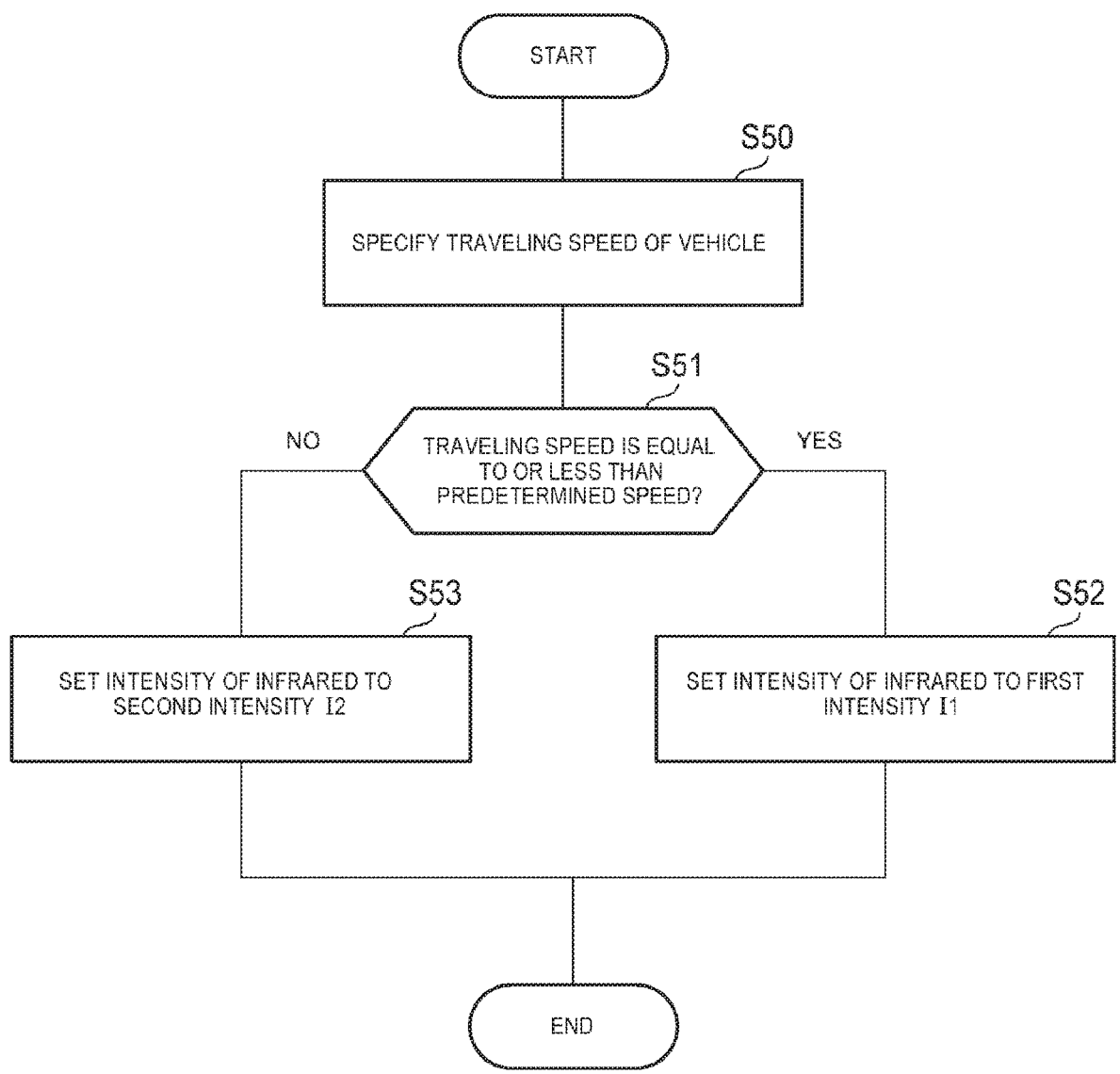
FIG. 10 is a flowchart depicting processing of increasing the intensity of the infrared to be emitted from the left or right infrared irradiation unit, in correspondence to a traveling speed of the vehicle.

Sixth Example Processing of Changing Intensity of Infrared to be Emitted from Infrared Irradiation Unit 22 in Correspondence to Traveling Speed of Vehicle Subsequently, as a sixth example, processing of changing the intensity of the infrared to be emitted from the infrared irradiation unit 22 in correspondence to the traveling speed of the vehicle 1 is described with reference to FIG. 10. FIG. 10 is a flowchart depicting processing of increasing the intensity of the infrared to be emitted from the infrared irradiation unit 22, in correspondence to the traveling speed of the vehicle 1.

As shown in FIG. 10, in step S50, the vehicle control unit 3 acquires information about the traveling speed of the vehicle 1 from a speed sensor configured to detect the traveling speed of the vehicle 1. Next, the vehicle control unit 3 determines whether the traveling speed of the vehicle 1 is equal to or less than a predetermined speed (step S51). Herein, the predetermined speed is, for example, 30 km/h.

Next, when it is determined that the traveling speed of the vehicle 1 is equal to or less than the predetermined speed (YES in step S51), the vehicle control unit 3 transmits a trigger signal for setting the intensity of the infrared to the second intensity I2 to each of the control units 21L and 21R. Then, the control unit 21L sets the intensity of the infrared to be emitted from the left infrared irradiation unit 22L to the second intensity I2, based on the trigger signal transmitted from the vehicle control unit 3. Also, the control unit 21R sets the intensity of the infrared to be emitted from the right infrared irradiation unit 22R to the second intensity I2, based on the trigger signal transmitted from the vehicle control unit 3 (step S52).

On the other hand, when it is determined that the traveling speed of the vehicle 1 is not equal to or less than the predetermined speed (NO in step S51), the vehicle control unit 3 transmits a control signal for setting the intensity of the infrared to the first intensity I1 (<I2) to each of the control units 21L and 21R. Herein, the second intensity I2 is greater than the first intensity I1. Then, the control unit 21L sets the intensity of the infrared to be emitted from the left infrared irradiation unit 22L to the first intensity I1, based on the trigger signal transmitted from the vehicle control unit 3. Also, the control unit 21R sets the intensity of the infrared to be emitted from the right infrared irradiation unit 22R to the first intensity I1, based on the trigger signal transmitted from the vehicle control unit 3 (step S53).

In this way, when the traveling speed of the vehicle 1 is equal to or less than the predetermined speed, the intensity of the infrared to be emitted from the left infrared irradiation unit 22L is increased. For this reason, when the traveling speed of the vehicle 1 is equal to or less than the predetermined speed (particularly, when the vehicle 1 is traveling at low speed or when the vehicle 1 stops), the left infrared camera 26L can securely detect the surrounding environment in the detection range of the left infrared camera 26L.

Similarly, when the traveling speed of the vehicle 1 is equal to or less than the predetermined speed (particularly, when the vehicle 1 is traveling at low speed or when the vehicle 1 stops), the intensity of the infrared to be emitted from the right infrared irradiation unit 22R is increased. For this reason, when the traveling speed of the vehicle 1 is equal to or less than the predetermined speed, the right infrared camera 26R can securely detect the surrounding environment in the detection range of the right infrared camera 26R. That is, when the vehicle 1 is traveling at low speed or when the vehicle 1 stops, it is thought that the traveling state of the vehicle 1 largely changes or a target object such as a pedestrian exists around the vehicle 1. In this situation, it is preferably to securely detect the surrounding environment in the detection ranges of the left infrared camera 26L and the right infrared camera 26R.

In the present example, when it is determined that the traveling speed of the vehicle 1 is equal to or less than the predetermined speed, the intensity of the infrared is set to the second intensity I2. However, the present embodiment is not limited thereto. For example, the intensity of the infrared may be changed stepwise or continuously, in correspondence to the traveling speed of the vehicle 1.

Although the embodiment of the present disclosure has been described, it goes without saying that the technical scope of the present disclosure should not be interpreted as being limited by the descriptions of the embodiment. It will be understood by one skilled in the art that the embodiment is just exemplary and can be diversely changed within the scope of the invention defined in the claims. The technical scope of the present disclosure should be determined on the basis of the scope of the invention defined in the claims and its equivalent scope.

In the embodiment, the driving mode of the vehicle includes the full-automatic driving mode, the advanced driving support mode, the driving support mode, and the manual driving mode. However, the driving mode of the vehicle should not be limited to the four modes. The classification of the driving mode of the vehicle may be appropriately changed, in accordance with laws or rules relating to the automatic driving in each country. Likewise, the definitions of "the full-automatic driving mode", "the advanced driving support mode" and "the driving support mode" described in the embodiment are just examples, and can be appropriately changed, in accordance with laws or rules relating to the automatic driving in each country.

The invention claimed is:

1. An infrared camera system provided to a vehicle, the infrared camera system comprising:
   an infrared irradiator configured to emit infrared toward a side region of the vehicle;
   an infrared camera configured to acquire infrared image data indicative of a surrounding environment in the side region of the vehicle, and
   a controller configured to control an operation of the infrared irradiator,
   wherein the controller is configured to change an intensity of the infrared emitted from the infrared irradiator, in correspondence to a condition relating to a traveling state of the vehicle,
   wherein the infrared irradiator comprises:
      a left infrared irradiator configured to emit the infrared toward a left side region of the vehicle, and
      a right infrared irradiator configured to emit the infrared toward a right side region of the vehicle,
   wherein the controller is configured to increase the intensity of the infrared emitted from the left infrared irradiator, based on a first information indicating the movement of the vehicle to the left, and to increase the intensity of the infrared emitted from the right infrared irradiator, based on a second information indicating the movement of the vehicle to the right,
   wherein the infrared camera comprises:
      a left infrared camera configured to acquire infrared image data indicative of a surrounding environment in the left side region of the vehicle, and
      a right infrared camera configured to acquire infrared image data indicative of a surrounding environment in the right side region of the vehicle, and
   wherein the controller is configured to change the intensity of the infrared emitted from the left infrared irradiator and/or the right infrared irradiator, in correspondence to the condition relating to the traveling state of the vehicle.

2. The infrared camera system according to claim 1, wherein the controller is configured to increase the intensity of the infrared emitted from the left infrared irradiator, in correspondence to a leftward curve traveling of the vehicle, and to increase the intensity of the infrared emitted from the right infrared irradiator, in correspondence to a rightward curve traveling of the vehicle.

3. The infrared camera system according to claim 2, wherein the controller is configured to increase the intensity of the infrared emitted from the left infrared irradiator to be greater than the intensity of the infrared emitted from the right infrared irradiator, in correspondence to the leftward curve traveling of the vehicle, and to increase the intensity of the infrared emitted from the right infrared irradiator to be greater than the intensity of the infrared emitted from the left infrared irradiator, in correspondence to the rightward curve traveling of the vehicle.

4. The infrared camera system according to claim 1, wherein the controller increases the intensity of the infrared emitted from the left infrared irradiator when the vehicle is moved to a left traffic lane, and increases the intensity of the infrared emitted from the right infrared irradiator when the vehicle is moved to a right traffic lane.

5. The infrared camera system according to claim 1, wherein the controller is configured to increase the intensity of the infrared emitted from the infrared irradiator, in correspondence to a steering angle of a steering wheel.

6. The infrared camera system according to claim 1, wherein the controller increases the intensity of the infrared emitted from the right infrared irradiator when a steering angle of a steering wheel in a counterclockwise direction exceeds a first steering angle, and increases the intensity of the infrared emitted from the left infrared irradiator when the steering angle of the steering wheel in a clockwise direction exceeds a second steering angle.

7. The infrared camera system according to claim 1, wherein the controller is configured to increase the intensity of the infrared emitted from the left infrared irradiator, in correspondence to lighting of a left turn signal lamp, and to increase the intensity of the infrared emitted from the right infrared irradiator, in correspondence to lighting of a right turn signal lamp.

8. The infrared camera system according to claim 1, wherein the controller is configured to increase the intensity of the infrared emitted from the infrared irradiator, in correspondence to a curve traveling of the vehicle.

9. The infrared camera system according to claim 1, wherein the controller is configured to increase the intensity of the infrared emitted from the infrared irradiator, in correspondence to lighting of a turn signal lamp.

10. The infrared camera system according to claim 1, wherein the controller increases the intensity of the infrared emitted from the infrared irradiator when a traveling speed of the vehicle is equal to or less than a predetermined speed.

11. A vehicle provided with the infrared camera system according to claim 1.

* * * * *